(12) United States Patent
Ogawa et al.

(10) Patent No.: US 10,921,517 B2
(45) Date of Patent: Feb. 16, 2021

(54) ELECTRO-OPTIC WAVEGUIDE DEVICE AND OPTICAL MODULE

(71) Applicant: Lumentum Japan, Inc., Kanagawa (JP)

(72) Inventors: Kensuke Ogawa, Tokyo (JP); Hiroki Irie, Kanagawa (JP); Hiroaki Inoue, Saitama (JP); Takayoshi Fukui, Kanagawa (JP); Shigehisa Tanaka, Tokyo (JP)

(73) Assignee: Lumentum Japan, Inc., Kanagawa (JP)

( * ) Notice: Subject to any disclaimer, the term of this patent is extended or adjusted under 35 U.S.C. 154(b) by 0 days.

(21) Appl. No.: 16/551,175

(22) Filed: Aug. 26, 2019

(65) Prior Publication Data
US 2020/0064548 A1 Feb. 27, 2020

(30) Foreign Application Priority Data

Aug. 27, 2018 (JP) ................................. 2018-158479

(51) Int. Cl.
*G02B 6/12* (2006.01)
*G02F 1/225* (2006.01)
*G02F 1/21* (2006.01)

(52) U.S. Cl.
CPC ....... *G02B 6/12007* (2013.01); *G02F 1/2257* (2013.01); *G02F 2001/212* (2013.01)

(58) Field of Classification Search
None
See application file for complete search history.

(56) References Cited

U.S. PATENT DOCUMENTS

| 7,970,241 | B2 | 6/2011 | Chen et al. |
| 2004/0208454 | A1 | 10/2004 | Montgomery et al. |
| 2011/0170820 | A1* | 7/2011 | Prather ............... G02F 1/065 385/2 |
| 2011/0211786 | A1* | 9/2011 | Ushida ............... G02F 1/025 385/2 |
| 2015/0298161 | A1 | 10/2015 | Beeckman et al. |

FOREIGN PATENT DOCUMENTS

JP 2006-515082 A 5/2006

* cited by examiner

*Primary Examiner* — Omar R Rojas
(74) *Attorney, Agent, or Firm* — Harrity & Harrity, LLP

(57) ABSTRACT

An electro-optic waveguide device may include a slot waveguide including a lower high-refractive-index layer with a first refractive index and an upper high-refractive-index layer with a second refractive index, wherein the lower high-refractive-index layer and the upper high-refractive-index layer have conductivity and are disposed to face each other with a gap; and a slot part formed as a low-refractive-index layer, wherein the low-refractive-index layer is formed of a material producing an electro-optic effect and has a third refractive index lower than the first refractive index and the second refractive index, wherein the low-refractive-index layer is formed in the gap to come into contact with the lower high-refractive-index layer and the upper high-refractive-index layer, and wherein one of the lower high-refractive-index layer or the upper high-refractive-index layer includes a stretch stretching on both sides of a contact portion with the slot part in a width direction intersecting a transmission direction.

20 Claims, 18 Drawing Sheets

ELECTRO-OPTIC WAVEGUIDE DEVICE AND OPTICAL MODULE

CROSS-REFERENCE TO RELATED APPLICATION

The present application claims priority from Japanese application JP2018-158479 filed on Aug. 27, 2018, the content of which is hereby incorporated by reference into this application.

FIELD OF THE INVENTION

The present invention relates to an electro-optic waveguide device including a slot waveguide in which a material producing an electro-optic effect is arranged in a slot, and an optical module using the same.

BACKGROUND OF THE INVENTION

A slot waveguide is a waveguide that has a structure in which a narrow low-refractive-index region is interposed between high-refractive-index media and can strongly confine light in a slot part which is a sub-wavelength region.

Some techniques use a slot waveguide that has a laminated structure including two silicon layers as high-refractive-index media and a ferroelectric layer interposed as a low-refractive-index medium between the silicon layers. In the laminated structure, the two high-refractive-index layers and the low-refractive-index layer of the slot part interposed therebetween have substantially the same width and a side surface of each layer forms a common vertical surface as in a cross-sectional shape of a normal rectangular waveguide.

A slot waveguide may include two waveguides of high-refractive media that are formed of a semiconductor material doped to have conductivity respectively and are horizontally disposed in parallel on a substrate, and lithium niobate interposed as a low-refractive-index medium in a slot formed in the vertical direction between the two waveguides. In this structure, the upper surface of the waveguides of the high-refractive-index media and the upper surface of the low-refractive-index medium interposed in the slot form a common horizontal surface.

Some techniques use an electro-optic modulator that includes a body region formed of a first conductive silicon, a gate region formed of a second conductive silicon and overlapping the body region, and a dielectric layer inserted between the regions to come into contact with the regions. With regard to a waveguide used in connection with the electro-optic modulator, since the thickness of the middle dielectric layer is very thin, there is no slot mode and guided light is distributed in a high-refractive-index region. In addition, since the thickness of the middle dielectric layer is very thin in the waveguide, an operation voltage can be reduced. However, since the high-refractive-index region needs to be doped with high concentration to increase carrier density, an optical loss due to optical absorption by carriers may increase.

SUMMARY OF THE INVENTION

In an electro-optic waveguide device in which a material for producing an electro-optic effect is disposed as a slot part between high-refractive-index media to form a slot waveguide and a change in a refractive index is caused in the slot part by an electric field generated by applying a potential difference to the two high-refractive-index media, further low-voltage driving is preferable.

Regarding this point, the electric field of the guided light generated in the slot between the two high-refractive-index layers disposed in parallel is changed in accordance with a position in a direction parallel to an interface between a high-refractive-index layer and a low-refractive-index layer due to a light confinement edge effect. Specifically, the intensity of the electric field decreases at end portions, compared to the middle portion. Accordingly, in a slot waveguide in which two high-refractive-index layers and a low-refractive-index layer are laminated so that side surfaces are aligned, an effect of the slot waveguide such as intensification of an electric field in a low-refractive-index layer according to the Gauss law becomes weak. Therefore, in an electro-optic waveguide device that performs phase modulation of guided light using the slot waveguide with such a configuration, the confinement effect of guided light in the low-refractive-index layer configured as the slot part decreases, and further there is a problem that the effect of reducing a driving voltage by raising the phase modulation efficiency decreases. When the intensity of an electric field generated in the low-refractive-index layer by a voltage generated by a modulated electric signal or a direct-current electric bias applied to a high-refractive-index layer decreases at an end portion due to the edge effect of a parallel plate capacitor, it is also disadvantageous to reduce a driving voltage.

Here, a modulation device that includes an electro-optic waveguide retaining single lateral mode guided light as a phase modulator is a device that is indispensable for today's large-capacity transmission. In this device, in order to propagate only the single lateral mode guided light, the width of the slot waveguide can be reduced, for example, to 1 micrometer ($\mu$m) or less. In particular, when the width of the slot waveguide is small as described above, an influence of the above-described edge effect is relatively high, and therefore, the foregoing problem is serious.

The invention provides an electro-optic waveguide device and an optical module operating at a low-amplitude voltage with high phase modulation efficiency.

In some implementations, an electro-optic waveguide device may include a slot waveguide including a lower high-refractive-index layer with a first refractive index and an upper high-refractive-index layer with a second refractive index, wherein the lower high-refractive-index layer and the upper high-refractive-index layer have conductivity and are disposed to face each other with a gap; and a slot part formed as a low-refractive-index layer, wherein the low-refractive-index layer is formed of a material producing an electro-optic effect and has a third refractive index lower than the first refractive index and the second refractive index, wherein the low-refractive-index layer is formed in the gap to come into contact with the lower high-refractive-index layer and the upper high-refractive-index layer, wherein one of the lower high-refractive-index layer or the upper high-refractive-index layer includes a stretch stretching on both sides of a contact portion with the slot part in a width direction intersecting a transmission direction of the slot waveguide, and wherein the other one of the lower high-refractive-index layer or the upper high-refractive-index layer includes portions facing the stretches in a cross-sectional shape in the width direction.

In a first implementation, each of the lower high-refractive-index layer and the upper high-refractive-index layer includes a stretch, and the stretch of the lower high-refractive-index layer and the stretch of the upper high-refractive-index layer include portions facing each other.

In a second implementation, alone or in combination with the first implementation, the slot part has a strip shape extending in the transmission direction, and the gap is located at the contact portion and the stretch of the lower high-refractive-index layer and the stretch of the upper high-refractive-index layer are equal to each another.

In a third implementation, alone or in combination with one or more of the first through second implementations, the electro-optic waveguide device includes a clad layer that contacts side surfaces of the low-refractive-index layer, has a refractive index lower than the low-refractive-index layer, and is disposed in the gap.

In a fourth implementation, alone or in combination with one or more of the first through third implementations, the contact portion is formed in a rib shape and extends in the transmission direction.

In a fifth implementation, alone or in combination with one or more of the first through fourth implementations, the low-refractive-index layer has a width larger than the slot part, and clad layers with a refractive index lower than the low-refractive-index layer are disposed in the gap.

In a sixth implementation, alone or in combination with one or more of the first through fifth implementations, the electro-optic waveguide device includes a lower contact region configured to have an electric resistance lower than the lower high-refractive-index layer and to electrically connect the lower high-refractive-index layer to an electrode; and an upper contact region configured to have an electric resistance lower than the upper high-refractive-index layer and to electrically connect the upper high-refractive-index layer to an electrode.

In a seventh implementation, alone or in combination with one or more of the first through sixth implementations, the lower contact region and the upper contact region are disposed to come into contact with the lower high-refractive-index layer or the upper high-refractive-index layer at positions spaced with the slot part in the width direction.

In an eighth implementation, alone or in combination with one or more of the first through seventh implementations, a contact portion of the lower high-refractive-index layer and a contact portion of the upper high-refractive-index layer with the slot part face each other in parallel.

In a ninth implementation, alone or in combination with one or more of the first through eighth implementations, in regard to an electric field generated between the lower high-refractive-index layer and the upper high-refractive-index layer when a voltage is applied, dimensions of the stretch, in a horizontal direction, are determined so that a reducing rate of an electric field intensity at end portions compared to a middle portion of the slot part in the width direction is set to a predetermined value.

In some implementations, an optical module includes an electro-optic waveguide device comprising a slot waveguide including a lower high-refractive-index layer with a first refractive index and an upper high-refractive-index layer with a second refractive index, wherein the lower high-refractive-index layer and the upper high-refractive-index layer have conductivity and are disposed to face each other with a gap; and a slot part formed as a low-refractive-index layer, wherein the low-refractive-index layer is formed of a material producing an electro-optic effect and has a third refractive index lower than the first refractive index and the second refractive index, wherein the low-refractive-index layer is formed in the gap to come into contact with the lower high-refractive-index layer and the upper high-refractive-index layer, wherein one of the lower high-refractive-index layer or the upper high-refractive-index layer includes a stretch stretching on both sides of a contact portion with the slot part in a width direction intersecting a transmission direction of the slot waveguide, and wherein the other one of the lower high-refractive-index layer or the upper high-refractive-index layer includes portions facing the stretches in a cross-sectional shape in the width direction; a light source optically connected to the electro-optic waveguide device; and a medium for transmitting light passing through the electro-optic waveguide device.

In a tenth implementation, alone or in combination with one or more of the first through ninth implementations, each of the lower high-refractive-index layer and the upper high-refractive-index layer includes a stretch, and the stretch of the lower high-refractive-index layer and the stretch of the upper high-refractive-index layer include portions facing each other.

In an eleventh implementation, alone or in combination with one or more of the first through tenth implementations, the slot part has a strip shape extending in the transmission direction, and the gap is located at the contact portion and the stretch of the lower high-refractive-index layer and the stretch of the upper high-refractive-index layer are equal to each another.

In a twelfth implementation, alone or in combination with one or more of the first through eleventh implementations, the optical module includes a clad layer that contacts side surfaces of the low-refractive-index layer, has a refractive index lower than the low-refractive-index layer, and is disposed in the gap.

In a thirteenth implementation, alone or in combination with one or more of the first through twelfth implementations, the contact portion is formed in a rib shape and extends in the transmission direction.

In a fourteenth implementation, alone or in combination with one or more of the first through thirteenth implementations, the low-refractive-index layer has a width larger than the slot part, and clad layers with a refractive index lower than the low-refractive-index layer are disposed in the gap.

In a fifteenth implementation, alone or in combination with one or more of the first through fourteenth implementations, the optical module includes a lower contact region configured to have an electric resistance lower than the lower high-refractive-index layer and to electrically connect the lower high-refractive-index layer to an electrode; and an upper contact region configured to have an electric resistance lower than the upper high-refractive-index layer and to electrically connect the upper high-refractive-index layer to an electrode.

In a sixteenth implementation, alone or in combination with one or more of the first through fifteenth implementations, the lower contact region and the upper contact region are disposed to come into contact with the lower high-refractive-index layer or the upper high-refractive-index layer at positions spaced with the slot part in the width direction.

In a seventeenth implementation, alone or in combination with one or more of the first through sixteenth implementations, a contact portion of the lower high-refractive-index layer and a contact portion of the upper high-refractive-index layer with the slot part face each other in parallel.

In an eighteenth implementation, alone or in combination with one or more of the first through seventeenth implementations, in regard to an electric field generated between the lower high-refractive-index layer and the upper highrefractive-index layer when a voltage is applied, dimensions of the stretch, in a horizontal direction, are determined so that a reducing rate of an electric field intensity at end portions compared to a middle portion of the slot part in the width direction is set to a predetermined value.

DETAILED DESCRIPTION OF THE INVENTION

Figure 1:
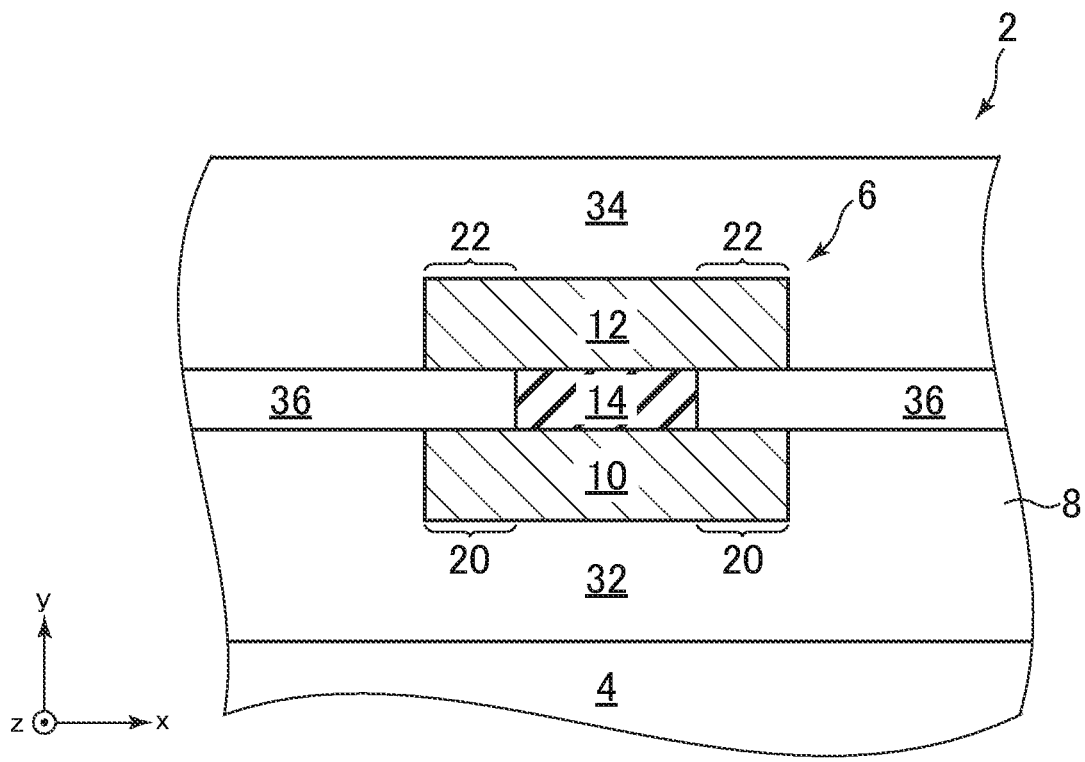
FIG. 1 is a schematic vertical sectional view illustrating an electro-optic waveguide device according to a first embodiment of the present invention.

Hereinafter, embodiments of the present invention (hereinafter, referred to as embodiments) will be described with reference to the drawings.

The disclosure is merely exemplary and it is apparent to those skilled in the art that the appropriate changes easily made within the gist of the present invention are, of course, included in the scope of the present invention. In order to further facilitate the description, the width, thickness, shape, and the like of each portion are more schematically illustrated in the drawings than in the actual form, which is merely exemplary and does not limit interpretation of the present invention. In the present specification and each drawing, the same reference numerals are given to elements similar to those of the previously described drawings and the detailed description thereof will be appropriately omitted.

FIG. 1 is a schematic vertical sectional view illustrating an electro-optic waveguide device 2 according to a first embodiment and illustrating a cross-section perpendicular to a transmission direction of light, that is, an extension direction of a waveguide.

First, the basic points of the electro-optic waveguide device 2 according to the present invention will be described. In the electro-optic waveguide device 2 according to the present invention, a waveguide is formed on a substrate 4 having a flat surface. The waveguide includes a structure serving as a core (a core part 6) and a clad region 8 surrounding the core part 6. FIG. 1 is a schematic view. For example, a structure of other layers and the like between the substrate 4 and the clad region 8 is not illustrated. In the following description, a right-handed type of xyz Cartesian coordinate system is adopted, the x-axis is set to a direction orthogonal to the extension direction of the waveguide (the horizontal direction in FIG. 1), the y-axis is set to a direction orthogonal to the substrate 4 (the vertical direction in FIG. 1), and the z-axis is set to the extension direction of the waveguide. The positive direction of the x-axis in FIG. 1 is the right direction and the positive direction of the y-axis is the upward direction.

The core part 6 has the structure of the above-described slot waveguide and includes two high-refractive-index layers 10 and 12 of thin films disposed to be laminated with a gap (slot) therebetween and a low-refractive-index layer 14 (slot part) disposed in a slot. In the slot waveguide, guided light tends to be strongly localized in the slot part. In case of two-dimensional slot waveguide, it is possible to achieve confinement of guided light in the core part by adjusting the film thicknesses of the high-refractive-index layers and the low-refractive-index layer (the dimension in the vertical direction in FIG. 1) and localizing the guided light in the slot part. The guided light is localized when an electric field of the guided light is orthogonal to a boundary surface between the high-reflective index layers and the low-refractive-index layer, that is, when the electric field of the guided light is in a TM polarization state in which the electric field of the guided light is linearly polarized in the vertical direction in FIG. 1.

An electro-optic modulation device that is used for large-capacity light transmission performs optical modulation with a high extinction ratio or Q value, using a 3-dimensional waveguide that propagates only single lateral mode guided light. Regarding this point, the electro-optic waveguide device according to the present invention has a characteristic form and structure on the xy cross-section of the core part. For example, when the high-refractive-index layers extend in the x-direction as in a slab type, the edge effect in the above-described slot part decreases.

Specifically, in the present invention, when the x-axis direction is the width direction, the high-refractive-index layers 10 and 12 have a larger width than the low-refractive-index layer 14 and have portions stretching to the laterally outer side from the portions contacting the low-refractive-index layer 14. By applying a voltage to the high-refractive-index layers 10 and 12 from the outside, an electric field is formed also in the gap interposed between stretches 20 and 22, and the electric field functions to suppress the edge effect with regard to the electric field of the guided light at the end portions of the low-refractive-index layer 14.

In addition, an electric field generated in the gap between the high-refractive-index layers 10 and 12 in accordance with the applied voltage by a modulated electric signal or a direct-current electric bias from the outside is also weakened due to the edge effect in the end portions of the high-refractive-index layers 10 and 12. However, by forming the stretches 20 and 22 and spacing the end portions of the high-refractive-index layers 10 and 12 from end portions of the low-refractive-index layer 14, an influence of the edge effect can be avoided and the intensity difference between the electric fields applied to the middle and end portions of the low-refractive-index layer 14 can be reduced. That is, it is possible to apply an electric field with a uniform intensity distribution in the horizontal direction to the low-refractive-index layer 14 without receiving an influence of attenuation of the electric field at the end portions of the high-refractive-index layers.

When the guided light is localized with regard to the horizontal direction and only the single lateral mode guided light is propagated, the width of the low-refractive-index layer is preferably limited.

To perform electro-optic modulation of the guided light, the low-refractive-index layer 14 configured as the slot part is formed of a material that produces an electro-optic effect. In particular, for example, an effect of changing a refractive index in accordance with an external electric field, such as the Pockels effect or the Kerr effect, is used as the electro-optic effect. Specifically, the refractive index of the low-refractive-index layer 14 is modulated by applying a high-frequency electric signal to the high-refractive-index layers 10 and 12.

Figure 2:
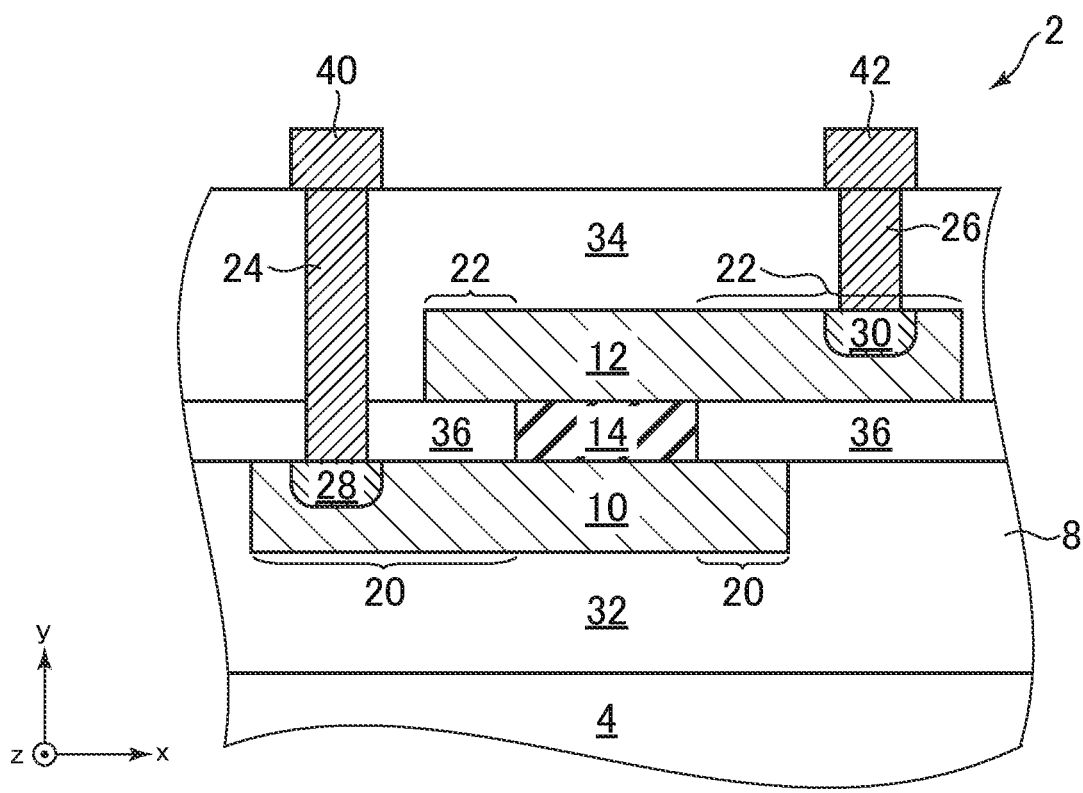
FIG. 2 is a schematic vertical sectional view illustrating the electro-optic waveguide device according to the first embodiment of the present invention.

The high-refractive-index layers 10 and 12 need to have conductivity. Specifically, the high-refractive-index layers 10 and 12 are formed of a semiconductor material doped with impurities to generate carriers. For example, metal electrodes are connected to the high-refractive-index layers 10 and 12 in order to apply an electric signal from the outside. FIG. 2 is a schematic xy sectional view illustrating the electro-optic waveguide device 2. FIG. 2 illustrates a cross-section different from FIG. 1 in the position in the z-axis direction and an example of a connection structure of the high-refractive-index layers 10 and 12 and the metal electrodes. For ohmic contact of connection portions between the high-refractive-index layers 10 and 12 and plugs 24 and 26 forming parts of the metal electrodes, contact regions 28 and 30 that have an electric resistance lower than the high-refractive-index layers 10 and 12 are provided. Specifically, the contact regions 28 and 30 can be formed by doping parts of the high-refractive-index layers 10 and 12 with higher concentration.

Here, when a doped amount of the high-refractive-index layer increases, a carrier density increases and optical absorption by carriers increases. Accordingly, when the core part 6 that confines the guided light has a highly doped region, the problem that an optical loss increases occurs. From this viewpoint, as described above, the optical loss can be reduced by expanding the high-refractive-index layers 10 and 12 in the horizontal direction and disposing the contact regions 28 and 30 at positions spaced from the core part 6.

In the electro-optic waveguide device 2, the direction of an electric field of the guided light is also the vertical direction in correspondence with the alignment of the high-refractive-index layers 10 and 12 and the low-refractive-index layer 14 in the vertical direction. On the other hand, when two high-refractive-index regions and a low-refractive-index region interposed therebetween are arranged in the horizontal direction, as in the configuration of U.S. Pat. No. 7,970,241, the direction of the electric field of the guided light is the horizontal direction. In this case, when the high-refractive-index regions are expanded in the horizontal direction for connection or the like with the electrodes, the electric field of the guided light spreads in the horizontal direction inside the high-refractive-index regions, the electric field of the guided light localized in the low-refractive-index region of the slot part decreases, and thus phase modulation efficiency deteriorates. From this viewpoint, in the electro-optic waveguide device 2 according to the present invention, since the expansion direction of the high-refractive-index layer 10 is a direction perpendicular to the electric field of the guided light, the phase modulation efficiency can be ensured without damaging the confinement effect of the guided light in the slot waveguide in the core part 6.

The case in which the guided light is a TM polarized wave has been described above as an example. However, since others are similar to the TM polarized wave except for the localization effect of the guided light mentioned at the end, despite a TE polarized wave, the present invention may be applied to a TE polarized wave.

FIGS. 1 and 2 have been used regarding the electro-optic waveguide device 2 according to the above-described first embodiment in the foregoing description, but the content mentioned in the description is basically common to other embodiments to be described below.

Hereinafter, the description of the electro-optic waveguide device 2 according to the first embodiment will continue.

The clad region 8 includes a lower clad 32, an upper clad 34, and a side clad 36, as illustrated in FIG. 1.

At a position in the horizontal direction at which the low-refractive-index layer 14 is present, the substrate 4, the lower clad 32, the lower high-refractive-index layer 10, the low-refractive-index layer 14, the upper high-refractive-index layer 12, and the upper clad 34 are disposed in order from the lower side. The lower high-refractive-index layer 10 and the upper high-refractive-index layer 12 are of a slab type with a width greater than that of the low-refractive-index layer 14. The surfaces of the lower high-refractive-index layer 10 and the upper high-refractive-index layer 12 closer to the low-refractive-index layer 14 are flat and are disposed to face each other in parallel with a gap therebetween. The low-refractive-index layer 14 is located in the middle of the gap in the x-direction. The low-refractive-index layer 14 is formed in a strip shape extending in the z-axis direction, the xy cross-section is basically rectangular, and the lower and upper surfaces are in contact with the upper surface of the lower high-refractive-index layer 10 and the lower surface of the upper high-refractive-index layer 12, respectively.

On both sides of the low-refractive-index layer 14 in the horizontal direction, the side clad 36 is disposed to be in contact with the side surfaces of the low-refractive-index layer 14, the upper surface of the stretch 20 of the lower high-refractive-index layer 10, and the lower surface of the stretch 22 of the upper high-refractive-index layer 12. The lower clad 32 is provided to be in contact with the lower surface and the side surfaces of the lower high-refractive-index layer 10, and the upper surface of the lower high-refractive-index layer 10 and the upper surface of the lower clad 32 are formed in a common plane. The low-refractive-index layer 14 and the side clad 36 are laminated on this plane. The low-refractive-index layer 14 and the side clad 36 are formed with a common thickness and each upper surface forms a common plane. The upper high-refractive-index layer 12 and the upper clad 34 are laminated on the common plane. The upper clad 34 is provided to be in contact with the upper surface and the side surfaces of the upper high-refractive-index layer 12.

As illustrated in FIG. 2, at a position in the z-axis direction at which the plug 24 is provided, the lower high-refractive-index layer 10 extends in the horizontal direction further than in FIG. 1 and the lower contact region 28 is provided in the extension portion. Similarly, at a position in the z-axis direction at which the plug 26 is provided, the upper high-refractive-index layer 12 extends in the horizontal direction further than in FIG. 1 and the upper contact region 30 is provided in the extension portion. FIG. 2 illustrates an example in which the plug 24 connected to the lower high-refractive-index layer 10 and the plug 26 connected to the upper high-refractive-index layer 12 are disposed at the same position in the z-axis direction. In this case, the lower high-refractive-index layer 10 and the upper high-refractive-index layer 12 are extended in an opposite direction to each other in the horizontal direction. When the plug 24 and the plug 26 are disposed at different positions in the z-axis direction, both of the lower high-refractive-index layer 10 and the upper high-refractive-index layer 12 in the z coordinate can be extended in the same direction.

A refractive index (first refractive index) $n_1$ of the lower high-refractive-index layer 10, a refractive index (second refractive index) $n_2$ of the upper high-refractive-index layer 12, and a refractive index (third refractive index) $n_3$ of the low-refractive-index layer 14 are set to satisfy $n_1 > n_3$ and $n_2 > n_3$. In addition, $n_1$ and $n_2$ are set to be basically the same.

The refractive index of the side clad 36 is set to be basically equal on both sides of the low-refractive-index layer 14. When the refractive index is $n_4$, $n_4 < n_3$ is set. A refractive index $n_5$ of the lower clad 32 is set to satisfy $n_5 < n_1$ and a refractive index $n_6$ of the upper clad 34 is set to satisfy $n_6 < n_2$. In the embodiment, the refractive indexes $n_4$, $n_5$, and $n_6$ of each clad are set to be substantially equal, but the present invention is not limited thereto. To avoid mixing of polarization modes, it is preferable to maintain the symmetry of the polarization modes in the horizontal direction, but the present invention is not limited thereto.

As described above, the low-refractive-index layer 14 is formed of an electro-optic material. In the present invention, oriented lithium niobate ($LiNbO_3$, LN: refractive index of 2.23) is used as the low-refractive-index layer 14. The lower high-refractive-index layer 10 and the upper high-refractive-index layer 12 are formed of silicon (Si: refractive index of 3.45). For example, the lower high-refractive-index layer 10 has P-type polarity of conductivity and the upper high-refractive-index layer 12 has N-type polarity of conductivity. The polarities of the contact regions 28 and 30 are the same as the polarities of the high-refractive-index layers 10 and 12 in which the contact regions 28 and 30 are provided, respectively. Even when the polarities of the lower high-refractive-index layer 10 and the lower contact region 28 are reverse to each other and the polarities of the upper high-refractive-index layer 12 and the upper contact region 30 are reverse to each other, there is no influence on the operation principle of the electro-optic waveguide device 2, and thus the selection may be made so that manufacturing is easy. The materials of the lower clad 32, the upper clad 34, and the side clad 36 are all silica ($SiO_2$: refractive index of 1.45). The materials to be used are not limited to this material and other materials may be used. The refractive index depends on the wavelength of a light wave in a waveguide mode. The example of the case in which the value of the above-described refractive index is set when the guided light is set in a band of 1.3 to 1.5 μm has been described, but other values can be selected in other wavelengths.

Each of the lower high-refractive-index layer 10 and the upper high-refractive-index layer 12 according to the embodiment includes the stretch, and the stretch 20 of the lower high-refractive-index layer 10 and the stretch 22 of the upper high-refractive-index layer 12 include portions facing each other. The lengths of the gaps between the lower high-refractive-index layer 10 and the upper high-refractive-index layer 12 at the contact portions with the low-refractive-index layer 14 and the stretches 20 and 22 on both sides thereof are equal to one another. That is, when the thickness of the low-refractive-index layer 14 is expressed as $t_{low}$, the intervals of the gaps at the stretches 20 and 22 are also $t_{low}$. When a dielectric substance represented by lithium niobate (LN) that produces the Pockels effect is used for the low-refractive-index layer 14, $t_{low}$ is preferably in the range of 50 to 500 nm. When a material that has a nonlinear Kerr coefficient larger than the dielectric substance such as graphene is used for the low-refractive-index layer 14, the low-refractive-index layer 14 may be a thin layer that has $t_{low}$ of about 0.1 to 50 nm.

When the width of the low-refractive-index layer 14 in the horizontal direction is expressed as $w_{low}$, a confinement width of guided light in the horizontal direction is basically regulated to $w_{low}$. To propagate only a single lateral mode, $w_{low}$ is preferably 1 μm or less. On the other hand, to reduce an optical loss by light scattering caused by the roughness of a sidewall of the low-refractive-index layer 14, $w_{low}$ is preferably 400 nm or more.

For a thickness $t_{hi1}$ of the lower high-refractive-index layer 10 and a thickness $t_{hi2}$ of the upper high-refractive-index layer 12, suitable ranges can be set to improve confinement of guided light in the slot part (the low-refractive-index layer 14). When the thicknesses $t_{hi1}$ and $t_{hi2}$ are small, a problem may arise in that the guided light effuses to the outside of the slot waveguide and the effusing light spreads to an area lower than the lower high-refractive-index layer 10 and higher than the upper high-refractive-index layer 12. When the slot part is thickened in order to avoid this problem, a problem may arise in that a driving voltage for modulating the refractive index of the low-refractive-index layer 14 increases. Accordingly, the lower limits of the suitable ranges of $t_{hi1}$ and $t_{hi2}$ are determined in consideration of these problems. On the other hand, when the thicknesses $t_{hi1}$ and $t_{hi2}$ are large, most of the guided light distributes in the lower high-refractive-index layer 10 and the upper high-refractive-index layer 12 and a mode confinement coefficient of the low-refractive-index layer 14 decreases. As a result, the phase modulation efficiency by the electro-optic effect of the low-refractive-index layer 14 decreases and it is necessary to increase a driving voltage in order to supplement this decrease in the phase modulation efficiency. Accordingly, the upper limits of the suitable ranges of $t_{hi1}$ and $t_{hi2}$ are determined in consideration of this point. For example, the suitable ranges can be set to 100 to 250 nm.

The dimensions of the stretches 20 and 22 in the horizontal direction are expressed as $w_{ext}$. The stretches 20 and 22 mentioned herein basically relate to the cross-section illustrated in FIG. 1. By providing the stretches 20 and 22, it is possible to suppress or reduce the edge effect, as described above, and it is possible to reduce the driving voltage for modulating the refractive index of the low-refractive-index layer 14. Here, $w_{ext}$ is set to obtain the effect of suppressing the driving voltage.

Here, the influence of the edge effect at the end portions in the gap between the lower high-refractive-index layer 10 and the upper high-refractive-index layer 12 on the low-refractive-index layer 14 is reduced to a negligible degree when $w_{ext}$ is equal to or greater than a certain extent. In other words, the effect of reducing the influence of the edge effect is saturated with an increase in $w_{ext}$. On the other hand, as $w_{ext}$ increases, parasitic capacitance accompanying the lower high-refractive-index layer 10 and the upper high-refractive-index layer 12 increases, which interrupts high-speed driving of the electro-optic waveguide device 2. Accordingly, $w_{ext}$ can be set in consideration of a trade-off between the parasitic capacitance and the influence of the edge effect. For example, in regard to the electric field generated between the lower high-refractive-index layer 10 and the upper high-refractive-index layer 12 in accordance with the voltage applied from the outside, $w_{ext}$ is defined so that a reducing rate of the electric field intensity at the end portions compared to the middle portion of the low-refractive-index layer 14 in the width direction is set to a predetermined allowed value. That is, $w_{ext}$ is enlarged to the degree of a level at which the edge effect is allowed, but $w_{ext}$ can be set not to exceed the degree of the level in order to avoid an unnecessary increase in the parasitic capacitance.

The widths $w_{ext}$ of the stretches 20 and 22 may be about half of the width $w_{low}$ of the low-refractive-index layer 14 from the viewpoint of the distribution of the guided light. In order to avoid mixing of polarization modes, it is important to maintain the symmetry of the distribution of the guided light. For this reason, it is preferable to extend the widths $w_{ext}$ of the stretches 20 and 22 to 500 nm or more.

At the position corresponding to the cross-section of FIG. 2 in the z-axis direction, the stretches 20 and 22 are formed with a larger width than at the position corresponding to the cross-section of FIG. 1 and extend up to the positions at which the plugs 24 and 26 and the contact regions 28 and 30 are provided.

When the contact regions 28 and 30 are close to a distribution region of the guided light, power attenuation of the guided light due to optical absorption of carriers in the contact regions 28 and 30 may not be negligible. In contrast, when distances between the contact regions 28 and 30 and the contact portions of the high-refractive-index layers with the low-refractive-index layer 14 are long, a series electric resistance increases in the lower high-refractive-index layer 10 and the upper high-refractive-index layer 12 existing therebetween, which becomes a cause of interrupting a high-speed operation of the electro-optic waveguide device 2. Horizontal distances between the contact regions 28 and 30 and the low-refractive-index layer 14 are set in a suitable range in consideration of these points. For example, the central point of the contact regions 28 and 30 in the horizontal direction is preferably disposed at a position of 1 to 10 μm from the central point of the low-refractive-index layer 14 in the horizontal direction.

The metal electrodes connected to the lower high-refractive-index layer 10 and the upper high-refractive-index layer 12 include electrodes 40 and 42 which are portions provided on the upper surface of the upper clad 34; and the plugs 24 and 26 which are portions embedded in holes opened in the upper clad 34. The plugs 24 and 26 are formed, for example, in a columnar shape within the upper clad 34 and electrically connect the electrodes 40 and 42 to the contact regions 28 and 30.

The plug 24 and the upper high-refractive-index layer 12 are preferably separated by the thickness $t_{hi2}$ or more of the upper high-refractive-index layer 12 from the viewpoint of reducing the parasitic capacitance. From the viewpoint of reducing the parasitic capacitance between the upper contact region 30 (or the plug 26) and the lower high-refractive-index layer 10, the upper contact region 30 is preferably disposed at a horizontal position which does not overlap the lower high-refractive-index layer 10.

Here, the laminated structure of the lower high-refractive-index layer 10, the low-refractive-index layer 14, and the upper high-refractive-index layer 12, which constitutes the slot waveguide, is set to have a so-called PIN type in which the lower high-refractive-index layer 10 is of the P-type and the upper high-refractive-index layer 12 is of the N-type, but the present invention is not limited thereto. The laminated structure may have a PIP type or an NIN type.

Next, a method of manufacturing the electro-optic waveguide device 2 will be described. FIGS. 3 to 6 are schematic vertical sectional views illustrating the electro-optic waveguide device 2 to describe processes in the manufacturing method and illustrate the cross-section corresponding to FIG. 2.

For example, the electro-optic waveguide device 2 can be manufactured using a silicon on insulator (SOI) wafer on which an oriented lithium niobate (LN) layer is laminated. Specifically, the wafer has a structure in which an embedded oxide film 45 is formed on the surface of a silicon substrate 44, a silicon single-crystal layer is grown on the oxide film 45 to form an SOI layer 46, and a thin film LN layer 47 is formed on the surface of the SOI layer 46 by wafer bonding or the like.

Figure 3:
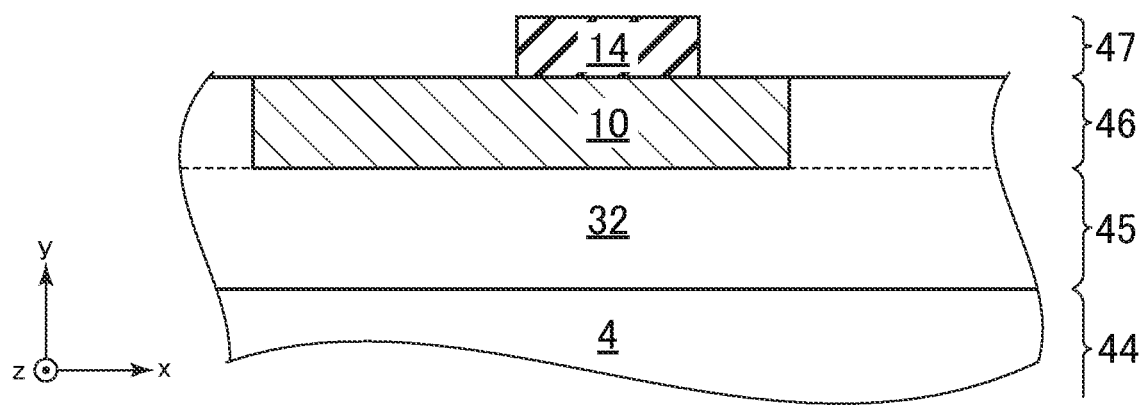
FIG. 3 is a schematic vertical sectional view illustrating a main manufacturing process for the electro-optic waveguide device according to the first embodiment of the present invention.

FIG. 3 is a schematic vertical sectional view illustrating a state in which the low-refractive-index layer 14 is formed using the wafer. The silicon substrate 44 of the wafer forms the above-described substrate 4 and the embedded oxide film 45 forms the lower clad 32. The lower high-refractive-index layer 10 is formed using the SOI layer 46 and the low-refractive-index layer 14 is formed using the thin film LN layer 47. A region serving as the lower high-refractive-index layer 10 in the SOI layer 46 is doped with P-type impurities to have conductivity. A region on the outside of the lower high-refractive-index layer 10 in the SOI layer 46 is oxidized to become the lower clad 32 integrated with the embedded oxide film 45. The low-refractive-index layer 14 is formed by processing the thin film LN layer 47 with a rectangular cross-sectional shape through the photolithographic technique. Specifically, the thin film LN layer 47 can be subjected to dry etching using a patterned photoresist as a mask to form the low-refractive-index layer 14.

The carrier concentration of the lower high-refractive-index layer 10 is preferably in the range of $10^{17}$ to $10^{19}$ cm$^{-3}$. This is because an increase in an optical loss is not negligible when the carrier concentration is higher than $10^{19}$ cm$^{-3}$ whereas the series electric resistance increases and the operation speed is lowered when the carrier concentration is lower than $10^{17}$ cm$^{-3}$.

Figure 4:
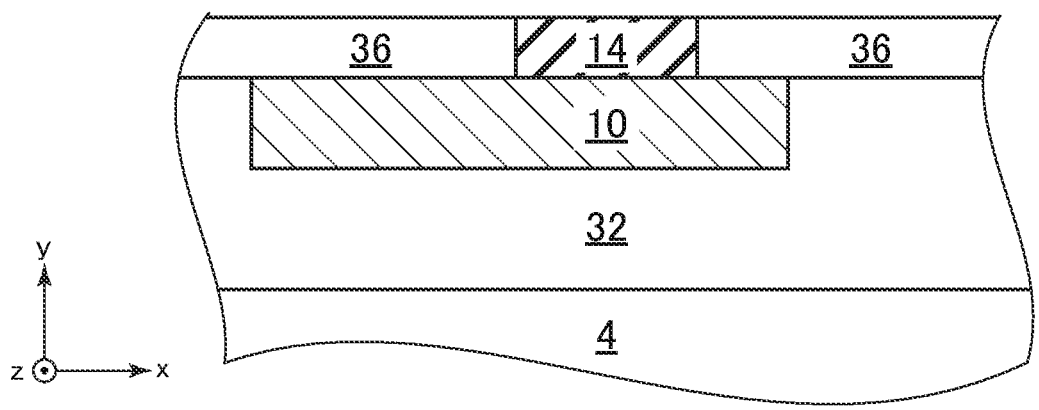
FIG. 4 is a schematic vertical sectional view illustrating a main manufacturing process for the electro-optic waveguide device according to the first embodiment of the present invention.

FIG. 4 is a schematic vertical sectional view illustrating a state in which the side clad 36 is formed. The side clad 36 is formed of silica. In the state of FIG. 3 in which the thin film LN layer 47 is patterned to form the low-refractive-index layer 14, silica is deposited on the surface of the substrate by chemical vapor deposition (CVD) and is flattened by chemical mechanical polishing (CMP). As a result, as illustrated in FIG. 4, the side clad 36 formed of the flattened silica region is formed on both sides of the low-refractive-index layer 14.

Figure 5:
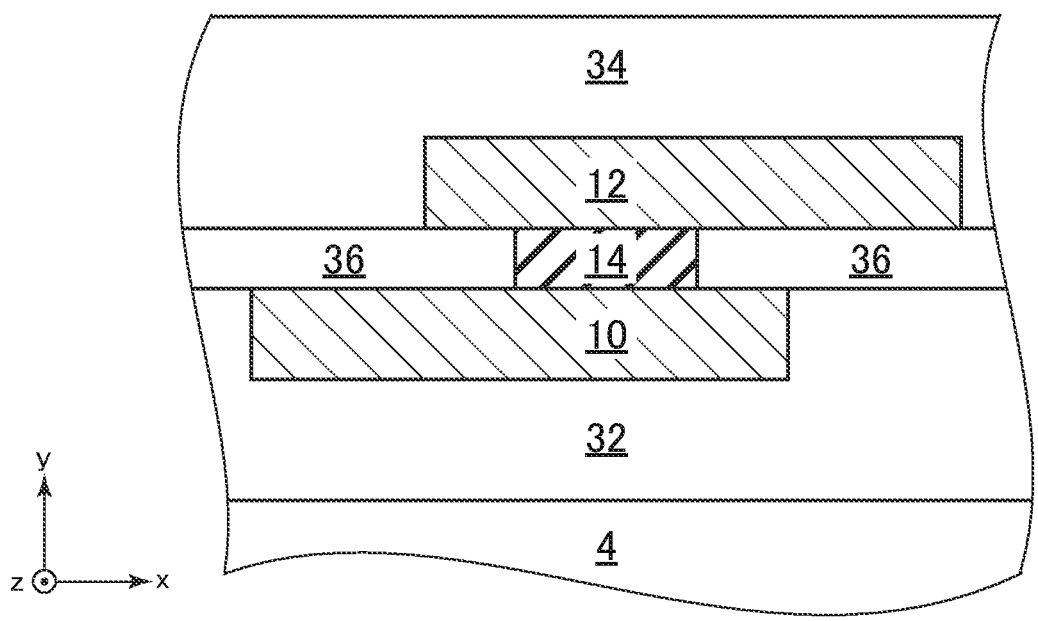
FIG. 5 is a schematic vertical sectional view illustrating a main manufacturing process for the electro-optic waveguide device according to the first embodiment of the present invention.

FIG. 5 is a schematic vertical sectional view illustrating a state in which the upper high-refractive-index layer 12 and the upper clad 34 are formed. The upper high-refractive-index layer 12 is formed of a silicon thin film and the upper clad 34 is formed of silica. First, in the state of FIG. 4 in which the side clad 36 and the low-refractive-index layer 14 are formed to be flat, a silicon thin film is formed on the surface of the substrate by CVD. The silicon thin film is doped with N-type impurities to have conductivity. Then, the silicon thin film is patterned by the photolithographic technique so that the region corresponding to the upper high-refractive-index layer 12 selectively remains. In this way, the silica is deposited by CVD on the surface of the substrate on which the upper high-refractive-index layer 12 is formed and is flattened by CMP. The flattened silica layer forms the upper clad 34.

Figure 6:
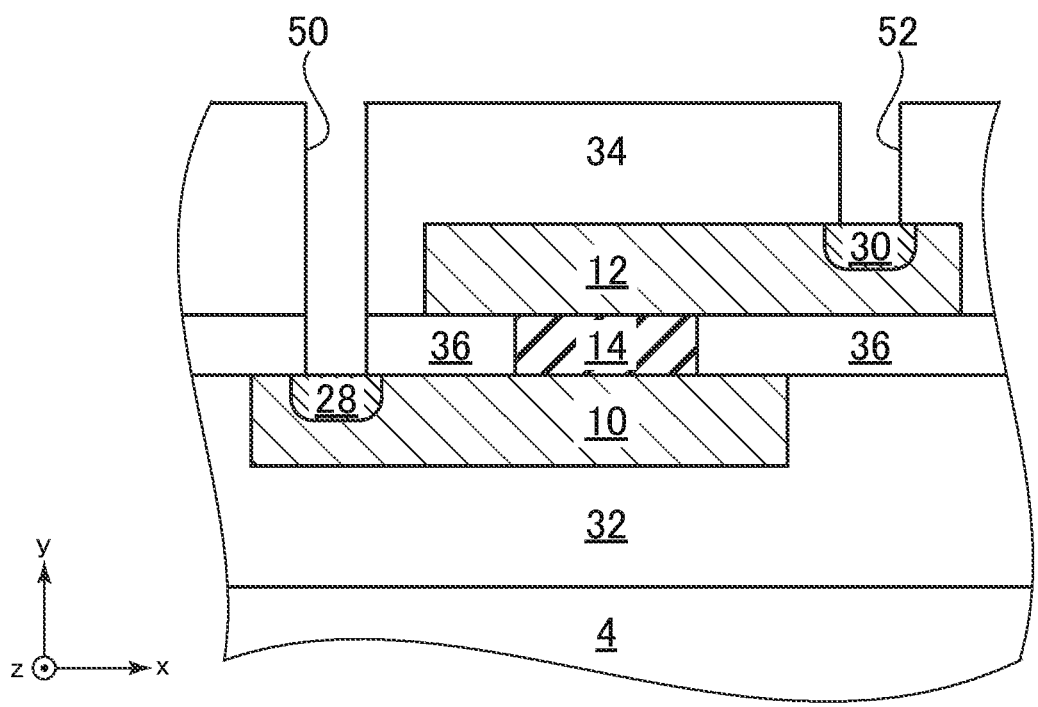
FIG. 6 is a schematic vertical sectional view illustrating a main manufacturing process for the electro-optic waveguide device according to the first embodiment of the present invention.

FIG. 6 is a schematic vertical sectional view illustrating a process of forming electrodes connected to the lower high-refractive-index layer 10 and the upper high-refractive-index layer 12. In the upper clad 34 formed to be flat in FIG. 5, contact holes 50 and 52 illustrated in FIG. 6 are formed by dry etching. The contact hole 50 is provided at a position at which the plug 24 to be connected to the lower high-refractive-index layer 10 is formed and penetrates through the upper clad 34 and the side clad 36 to reach the surface of the lower high-refractive-index layer 10. On the other hand, the contact hole 52 is provided at a position at which the plug 26 to be connected to the upper high-refractive-index layer 12 is formed and penetrates through the upper clad 34 to reach the surface of the upper high-refractive-index layer 12.

Ions are injected to the lower high-refractive-index layer 10 and the upper high-refractive-index layer 12 via the contact holes 50 and 52 to form highly doped regions on the bottom surfaces of the contact holes 50 and 52. The highly doped regions are the contact regions 28 and 30, as illustrated in FIG. 6. Carrier concentrations of the contact regions 28 and 30 are set to, for example, $10^{20}$ cm$^{-3}$ or more.

After the contact holes 50 and 52 and the contact regions 28 and 30 are formed, aluminum is deposited by sputtering or deposition to form the plugs 24 and 26 having the columnar shape in the contact holes 50 and 52. Further, after aluminum is deposited on the flattened upper clad 34, the electrodes 40 and 42 are formed from the aluminum by the photolithographic technique. Thus, the electro-optic waveguide device 2 having the cross-section structure illustrated in FIG. 2 is formed.

In the above-described process, the structure illustrated in FIG. 1 is also formed. The metal material used for the plugs 24 and 26 and the electrodes 40 and 42 is not limited to aluminum, and gold, copper, cobalt, or ruthenium which have a lower high-frequency electric resistance may be used.

The electro-optic waveguide device 2 according to a second embodiment of the present invention basically has a vertical cross-sectional structure similar to that of the electro-optic waveguide device 2 according to the first embodiment illustrated in FIGS. 1 and 2. However, the electro-optic waveguide device 2 according to the second embodiment of the present invention is created with a manufacturing method different from that of the first embodiment.

Hereinafter, a manufacturing method according to the second embodiment will be described with a structure corresponding to FIG. 2 as an example. In the embodiment, two SOI wafers are bonded to form the electro-optic waveguide device 2. A first SOI wafer is similar to the wafer used in the first embodiment and the wafer on which a thin film LN layer is laminated can be used. The SOI wafer is processed to have the structure illustrated in FIG. 3 as in the first embodiment.

Figure 7:
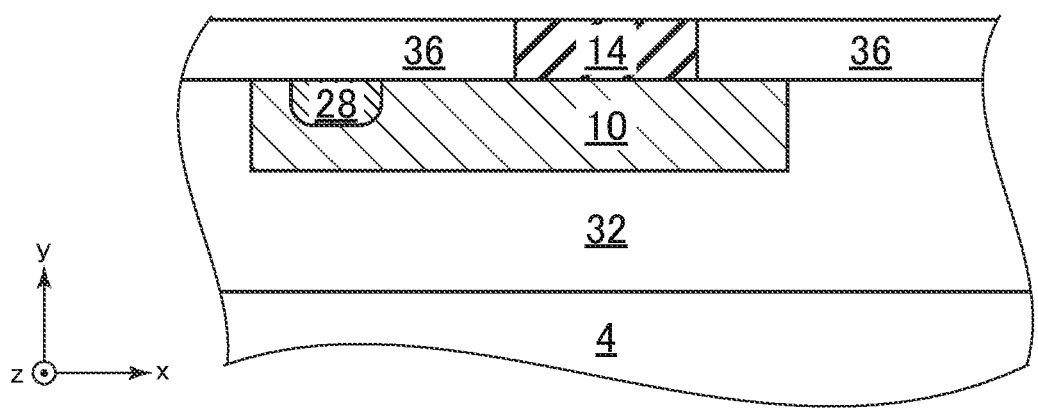
FIG. 7 is a schematic vertical sectional view illustrating a main manufacturing process for an electro-optic waveguide device according to a second embodiment of the present invention.

FIG. 7 is a schematic vertical sectional view illustrating the first SOI wafer in a process subsequent to FIG. 3. In FIG. 7, ions are injected to the surface of the lower high-refractive-index layer 10 to form the lower contact region 28. Thereafter, the side clad 36 is formed of silica, similarly to the process described in FIG. 4 in the first embodiment.

Figure 8:
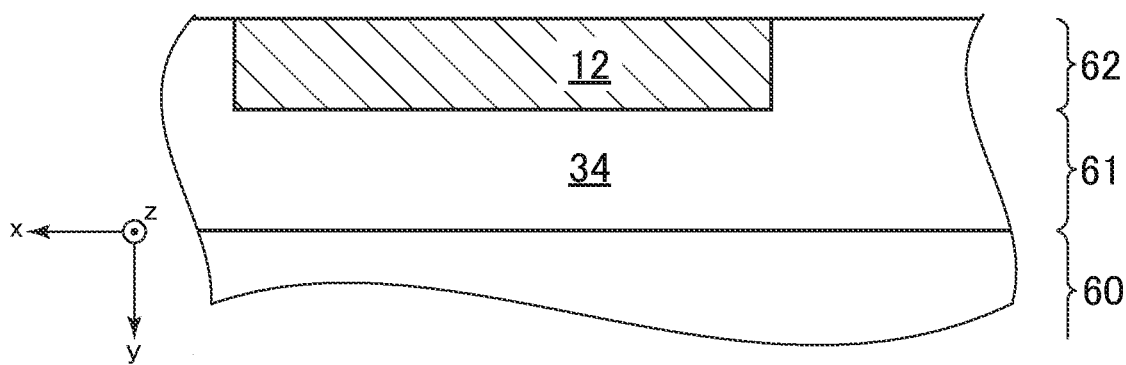
FIG. 8 is a schematic vertical sectional view illustrating a main manufacturing process for the electro-optic waveguide device according to the second embodiment of the present invention.

FIG. 8 is a schematic vertical sectional view illustrating a second SOI wafer. The second SOI wafer basically has a structure similar to that of the first SOI wafer except that the thin film LN layer is not included. That is, this wafer includes an embedded oxide film 61 formed on a silicon substrate 60 and an SOI layer 62 formed by growing a silicon single-crystal layer on the oxide film 61. The process of forming the lower clad 32 and the lower high-refractive-index layer 10 from the embedded oxide film 45 and the SOI layer 46 has been described with reference to FIG. 3. Similarly to this, the structure of FIG. 8 can be obtained by forming the upper clad 34 and the upper high-refractive-index layer 12 from the embedded oxide film 61 and the SOI layer 62 of the second SOI wafer.

Figure 9:
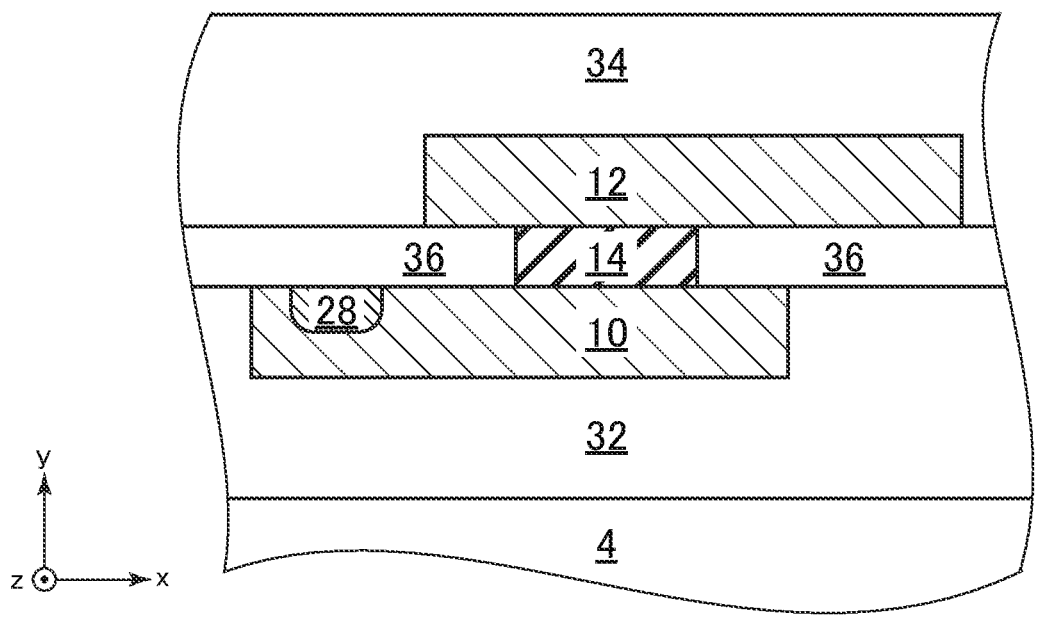
FIG. 9 is a schematic vertical sectional view illustrating a main manufacturing process for the electro-optic waveguide device according to the second embodiment of the present invention.

The second SOI wafer formed in the structure of FIG. 8 is bonded on the first SOI wafer formed in the structure of FIG. 7 to face the mutual surface (specifically, in the direction in which the xyz coordinate axes illustrated in FIGS. 7 and 8 match each other). Thereafter, the silicon substrate 60 of the second SOI wafer is removed by polishing and wet etching. FIG. 9 is a schematic vertical sectional view illustrating this state.

From the state of FIG. 9, the contact holes 50 and 52 and the contact region 30 are further formed, basically similar to the process described with reference to FIG. 6, and the electrodes 40 and 42 are formed to obtain the structure illustrated in FIG. 2. In addition, the contact hole 50 is formed at a position corresponding to the lower contact region 28.

In the manufacturing method according to the embodiment, since the upper high-refractive-index layer 12 can be formed using an SOI layer with good crystallinity as in the lower high-refractive-index layer 10, reduction of a light scattering loss of the upper high-refractive-index layer 12, and reduction of the series electric resistance, and the like are possible in addition to the effects of the first embodiment. That is, it is possible to achieve a reduction in an optical loss of the electro-optic waveguide device 2 and improvement in operation speed.

Figure 10:
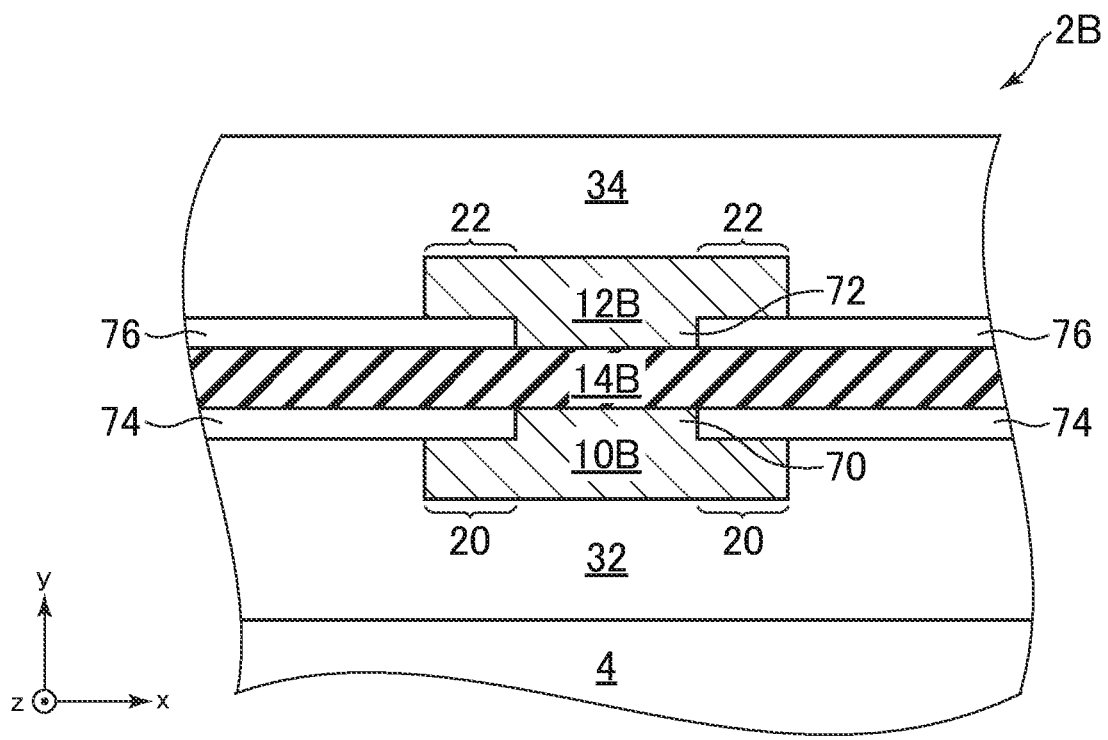
FIG. 10 is a schematic vertical sectional view illustrating an electro-optic waveguide device according to a third embodiment of the present invention.
Figure 11:
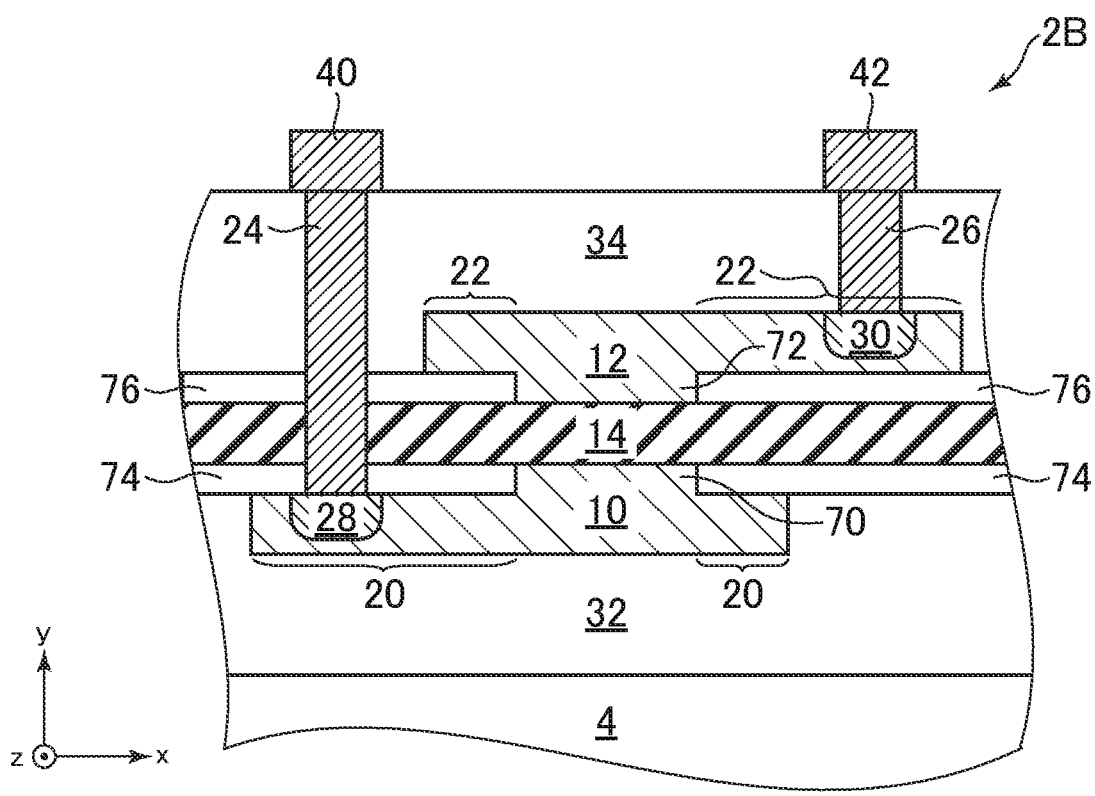
FIG. 11 is a schematic vertical sectional view illustrating the electro-optic waveguide device according to the third embodiment of the present invention.

FIGS. 10 and 11 are schematic vertical sectional views illustrating an electro-optic waveguide element 2B according to a third embodiment and illustrate the xy cross-section as in FIGS. 1 and 2. FIGS. 10 and 11 illustrate cross-sections different at the position in the z-axis direction. FIG. 10 corresponds to FIG. 1 of the first embodiment and illustrates a cross-section at a position at which the connection structure of the electrodes to the lower high-refractive-index layer and the upper high-refractive-index layer is not disposed. On the other hand, FIG. 11 corresponds to FIG. 2 of the first embodiment and illustrates a cross-section at a position at which the connection structure of the electrodes is disposed. Portions with common names (or numeral signs in the signs) in each part illustrated in the cross-section of the third embodiment and each part illustrated in the cross-section of the first embodiment can be formed of basically the same materials. For example, since a lower high-refractive-index layer 10B, an upper high-refractive-index layer 12B, and a low-refractive-index layer 14B according to the embodiment are different in a cross-sectional shape from the lower high-refractive-index layer 10, the upper high-refractive-index layer 12, and the low-refractive-index layer 14 according to the first embodiment, "B" is given to the signs to distinguish from each other in the description of the specification but can be formed of the same materials corresponding to the layers.

In the electro-optic waveguide device 2B, the lower high-refractive-index layer 10B and the upper high-refractive-index layer 12B include portions with a rib shape facing each other and extending in the transmission direction (rib portions 70 and 72). The low-refractive-index layer 14B is formed in a slab type.

In the first embodiment, the low-refractive-index layer 14 is formed with the relatively narrow width $w_{low}$ corresponding to the localization region of the guided light as the slot part. On the other hand, the lower high-refractive-index layer 10 and the upper high-refractive-index layer 12 are formed in the slab type with the uniform gap therebetween. In the structure of the first embodiment, the portions of the lower high-refractive-index layer 10 and the upper high-refractive-index layer 12 coming into contact with the low-refractive-index layer 14 are regulated in the planar shape of the low-refractive-index layer 14. That is, the width of the contact portions of the lower high-refractive-index layer 10 and the upper high-refractive-index layer 12 with the low-refractive-index layer 14 in the xy cross-section is defined as the width $w_{low}$ of the low-refractive-index layer 14.

In the third embodiment, however, the rib portions 70 and 72 in the lower high-refractive-index layer 10B and the upper high-refractive-index layer 12B are contact portions with the low-refractive-index layer 14B. That is, contact widths of the lower high-refractive-index layer 10B and the upper high-refractive-index layer 12B with the low-refractive-index layer 14B of the slab type are regulated with a width $w_{rib}$ of the rib portions 70 and 72, a portion interposed between the rib portions 70 and 72 in the low-refractive-index layer 14B and formed with the larger width than the rib portions 70 and 72 substantially serves as a slot part of a slot waveguide, and an electric field is applied from the lower high-refractive-index layer 10B and the upper high-refractive-index layer 12B, thereby contributing to electro-optic modulation of the guided light.

In the third embodiment, portions located on both sides of the rib portions 70 and 72 in the x-direction in the lower high-refractive-index layer 10B and the upper high-refractive-index layer 12B are equivalent to the stretches 20 and 22 mentioned in the first embodiment. By forming an electric field in the gap between the stretches 20 and 22 when a voltage is applied to the lower high-refractive-index layer 10B and the upper high-refractive-index layer 12B from the outside, it is possible to suppress or reduce the above-described edge effect in the slot part, and thus achieve the reduction in a driving voltage for refractive index modulation.

Clad layers 74 and 76 with a refractive index lower than the low-refractive-index layer 14B are disposed in gaps in which the stretches 20 and 22 face the low-refractive-index layer 14B, that is, gaps formed on the sides of the rib portions 70 and 72.

The low-refractive-index layer 14B is formed with a larger width than the slot part that localizes guided light, as described above. For example, when the low-refractive-index layer 14B is patterned by dry etching, the roughness of the sidewall of the low-refractive-index layer 14B occurs in some cases. The sidewall of the low-refractive-index layer 14B scatters the guided light, and thus there is a possibility of an optical loss occurring. As a configuration for avoiding the optical loss, a configuration can be possible in which a thin film LN layer is used as the low-refractive-index layer 14B in a slab shape without processing the thin film LN layer by dry etching. Alternatively, even when the sidewall is formed by dry etching, a configuration may be used in which the sidewall is formed outside the confinement region of guided light.

Accordingly, in the embodiment, the low-refractive-index layer 14B is formed in the slab type with a larger width than guided light. On the other hand, the rib portions 70 and 72 are formed in the lower high-refractive-index layer 10B and the upper high-refractive-index layer 12B and only a part of the low-refractive-index layer 14B is used as the slot part. In this structure, a confinement width in the horizontal direction in the guided light mode is determined as the width $w_{rib}$ of the rib portions 70 and 72. Since the width of the low-refractive-index layer 14B is greater than the confinement width in the horizontal direction of the guided light mode, the optical loss due to the scattering on the sidewall is avoided. In addition, by setting $w_{rib}$ to be 600 nm or less, only single lateral mode guided light propagates.

In the method of manufacturing the electro-optic waveguide device 2B, differences from the first embodiment will be described. The manufacturing method according to the embodiment is basically different from that of the first embodiment in the forming of the rib portions 70 and 72 and the clad layers 74 and 76.

The lower high-refractive-index layer 10B can be formed using the SOI layer on the surface of the SOI wafer. For example, the surface of the SOI layer is partially subjected to dry etching to form the rib portion 70 in a non-etch portion. Thereafter, silica is deposited by CVD and is flattened by CMP to form the clad layers 74 on both sides of the rib portion 70. The low-refractive-index layer 14B formed of the thin film LN layer is formed on the surface of the substrate.

The upper high-refractive-index layer 12B is formed to be partitioned into, for example, the rib portion 72 and a slab portion with a large width including the stretches 22 located above the rib portion 72. Specifically, a silicon layer with a thickness equivalent to the height of the rib portion 72 is deposited on the surface of the substrate on which the low-refractive-index layer 14B is formed and is processed in a strip shape by the photolithographic technique. The silicon layer patterned in the strip shape becomes the rib portion 72. After the silicon layer is patterned, the silica is deposited by CVD and is flattened by CMP to form the clad layers 76. A silicon layer is deposited on the surfaces of the clad layers 76 and the silicon layer serving as the rib portion 72 to form a slab portion of the upper high-refractive-index layer 12B by the photolithographic technique. The slab portion formed of the silicon layer is integrated with the previously formed silicon layer having a strip shape to form the upper high-refractive-index layer 12B. That is, the upper high-refractive-index layer 12B that includes the rib portion 72 which is the contact portion with the low-refractive-index layer 14B, and the slab portion located above the contact portion and including the stretches 22 on both sides thereof is formed.

Here, when the thicknesses of the lower high-refractive-index layer 10B and the upper high-refractive-index layer 12B in the contact portions with the slot part are large, as described in the first embodiment, most of the guided light is distributed in the lower high-refractive-index layer 10B and the upper high-refractive-index layer 12B, a ratio of the guided light confined in the slot part decreases, and thus there is a possibility that the phase modulation efficiency by the electro-optic effect decreases. From this viewpoint, the thickness of each of the lower high-refractive-index layer 10B and the upper high-refractive-index layer 12B in the portions in which the rib portions 70 and 72 are formed can be set to, for example, 250 nm or less.

For the thicknesses of the clad layers 74 and 76 (or the heights of the rib portions 70 and 72), when the clad layers 74 and 76 are thin, confinement of the guided light in the horizontal direction is not sufficient and there is a possibility that the guided light to be localized near the slot part spreads in the horizontal direction and a radiation loss occurs. From this viewpoint, the thicknesses of the clad layers 74 and 76 are preferably set to, for example, 50 nm or more.

On the other hand, when the thicknesses of the clad layers 74 and 76 are large, first, there is a possibility that the electric field formed between the stretches 20 and 22 is weakened and the effect of suppressing the edge effect deteriorates. Second, when the upper limit is set to the thicknesses of the lower high-refractive-index layer 10B and the upper high-refractive-index layer 12B, as described above, the thickness of the slab portion becomes smaller as the heights of the rib portions 70 and 72 increase. As a result, for example, there is a possibility that the series electric resistance between the rib portions 70 and 72 and the contact regions 28 and 30 increases and a high-frequency property of the electro-optic waveguide device 2B deteriorates. In addition, there is a possibility that resistances increase in the stretches 20 and 22 and the function of the electric field between the stretches 20 and 22 suppressing the edge effect is thus weakened. Accordingly, from these viewpoints, the upper limit can be set to the thicknesses of the clad layers 74 and 76. For example, the thicknesses of the clad layers 74 and 76 are preferably set to 100 nm or less.

Figure 12:
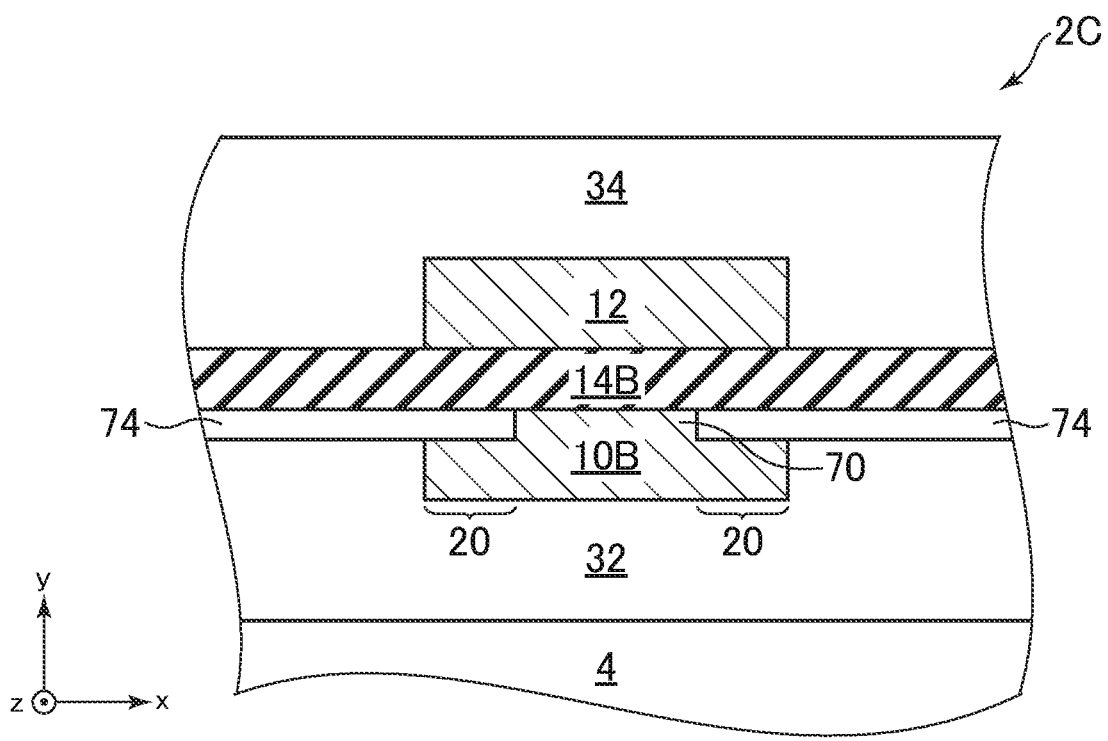
FIG. 12 is a schematic vertical sectional view illustrating an electro-optic waveguide device according to a fourth embodiment of the present invention.

FIG. 12 is a schematic vertical sectional view illustrating an electro-optic waveguide device 2C according to a fourth embodiment and illustrates the xy cross-section. As in FIGS. 1 and 9, FIG. 12 illustrates a cross-section at a position at which a connection structure of the electrodes to the lower high-refractive-index layer and the upper high-refractive-index layer is not disposed. On the other hand, in the embodiment, the electrodes are connected to the lower high-refractive-index layer and the upper high-refractive-index layer in a similar structure to that of each of the foregoing embodiments, but the illustration is omitted.

Even when the stretches are formed in one of the lower high-refractive-index layer and the upper high-refractive-index layer, it is possible to obtain the effect of suppressing the above-described edge effect. FIG. 12 illustrates this configuration. Specifically, the electro-optic waveguide device 2C includes the low-refractive-index layer 14B with the slab shape and the lower high-refractive-index layer 10B including the rib portion 70 as in the third embodiment. On the other hand, the upper high-refractive-index layer 12 is of a slab type similar to that of the first embodiment and includes no rib portion.

That is, in the embodiment, the lower high-refractive-index layer 10B includes the rib portion 70 which is a contact portion with the slot part and the stretches 20 stretching on both sides of the rib portion 70 in the x-direction. On the other hand, the upper high-refractive-index layer 12 is formed in a slab type with portions facing both stretches 20 of the lower high-refractive-index layer 10B in the shape of the xy cross-section. Here, the low-refractive-index layer 14B spreads in the x-direction, and therefore comes into contact with the entire lower surface of the upper high-refractive-index layer 12. Therefore, unlike the first embodiment, the upper high-refractive-index layer 12 according to the embodiment does not include the stretches 22.

By vertically reversing the structure of FIG. 12, it is possible to realize a structure which includes the upper high-refractive-index layer 12B including the rib portion 72 and the lower high-refractive-index layer 10 of the slab type including no rib portion.

Figure 13:
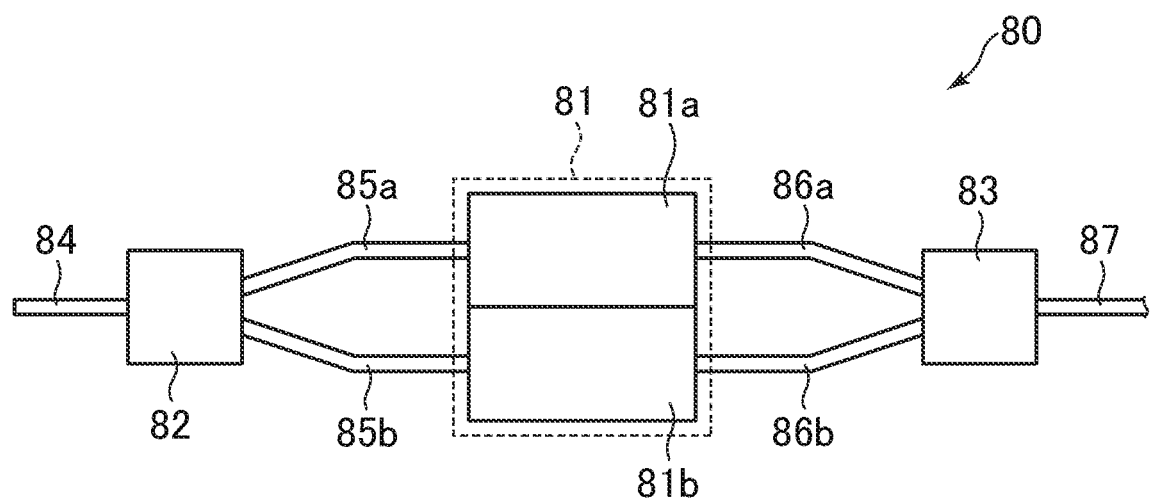
FIG. 13 is a schematic view illustrating a planar layout of a Mach-Zehnder optical modulator according to a fifth embodiment of the present invention.

FIG. 13 is a schematic view illustrating a planar layout of a Mach-Zehnder (MZ) optical modulator 80. The MZ optical modulator 80 includes two phase modulators 81a and 81b, a 1×2 splitter 82, a 2×1 coupler 83, and single-mode waveguides 84, 85a, 85b, 86a, 86b, and 87 connecting the above, which can be integrated on a common substrate to configure a one-chip device, for example.

Input light is input to the 1×2 splitter 82 via the waveguide 84 and is split into two rays of guided light in the 1×2 splitter 82. The split guided light is each input to the phase modulators 81a and 81b. The phase modulators 81a and 81b are of a push-pull type to perform phase modulation at mutually reverse phases to the input guided light. The guided light output from the phase modulators 81a and 81b is interfered and combined in the 2×1 coupler 83, and the 2×1 coupler 83 outputs the coupled light.

Figure 14:
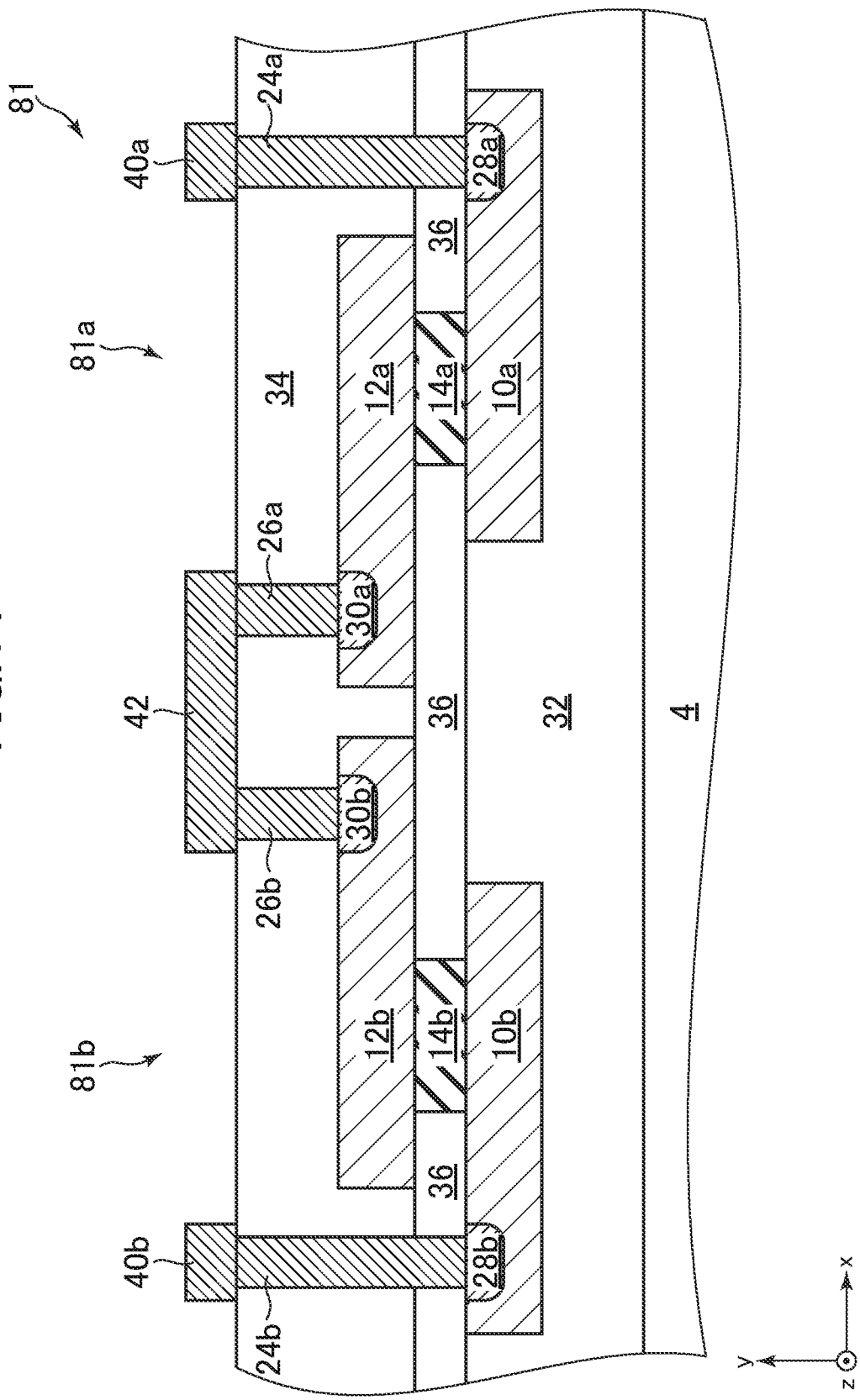
FIG. 14 is a schematic vertical sectional view illustrating the Mach-Zehnder optical modulator according to the fifth embodiment of the present invention.

The above-described electro-optic waveguide device according to each embodiment of the present invention can be applied to the phase modulators 81a and 81b of the MZ optical modulator 80. The phase modulators 81a and 81b include waveguides extending in the z-axis direction (the horizontal direction in FIG. 13) and are disposed side by side in the x-direction on the substrate in which the MZ optical modulator 80 is integrated. Here, a region in which the phase modulators 81a and 81b are formed on the substrate is referred to as a modulation part 81 for convenience. FIG. 14 is a schematic vertical sectional view illustrating the modulation part 81 according to the embodiment and illustrates the xy cross-section in which a connection structure of electrodes and high-refractive-index layers of the slot waveguide is illustrated.

The basic structure of the slot waveguides of the phase modulators 81a and 81b corresponds to that of the first embodiment described with reference to FIGS. 1 and 2. That is, the slot waveguides of the phase modulators 81a and 81b include lower high-refractive-index layers 10a and 10b corresponding to the lower high-refractive-index layer 10 of the electro-optic waveguide element 2 according to the first embodiment and similarly include upper high-refractive-index layers 12a and 12b corresponding to the upper high-refractive-index layer 12 and low-refractive-index layers 14a and 14b corresponding to the low-refractive-index layer 14. Accordingly, in the phase modulator 81a, the lower high-refractive-index layer 10a and the upper high-refractive-index layer 12a each having a slab shape are disposed to face a flat surface and the low-refractive-index layer 14a in a strip shape is disposed in the gap thereof. The lower high-refractive-index layer 10b, the upper high-refractive-index layer 12b, and the low-refractive-index layer 14b of the phase modulator 81b are similarly configured to form a slot waveguide. In addition, the lower high-refractive-index layer 10a and the lower high-refractive-index layer 10b are electrically separated and the upper high-refractive-index layer 12a and the upper high-refractive-index layer 12b are electrically separated.

Here, to realize the parallel push-pull connection of the phase modulators 81a and 81b, conductive types of the high-refractive-index layers are reverse between the phase modulators 81a and 81b. For example, the phase modulator 81a is configured so that the lower high-refractive-index layer 10a has P-type polarity and the upper high-refractive-index layer 12a has N-type polarity. The phase modulator 81b is configured so that the lower high-refractive-index layer 10b has N-type polarity and the upper high-refractive-index layer 12b has P-type polarity.

The lower high-refractive-index layers 10a and 10b are connected to electrodes 40a and 40b via plugs 24a and 24b, respectively, and the upper high-refractive-index layers 12a and 12b are connected to the common electrode 42 via plugs 26a and 26b, respectively. The plugs 24a and 24b are configured basically similar to the plug 24 according to the first embodiment and the plugs 26a and 26b are configured basically similar to the plug 26 according to the first embodiment. The electrodes 40a, 40b, and 42 configure a coplanar type traveling-wave electrode.

For example, the modulation part 81 is push-pull driven by one modulator driver for single-signal output. For example, the electrodes 40a and 40b are grounded and apply alternating-current signals output from the modulator driver to the electrode 42.

In the MZ optical modulator 80, the modulation part 81 is configured using the phase modulators 81a and 81b of a common structure to the first embodiment, and thus, the driving voltage can be reduced and the optical loss can be reduced, as described in the first embodiment. Consequently, the MZ optical modulator 80 can obtain a high-intensity extinction ratio and phase modulation Q value.

FIG. 14 illustrates the example in which the slot waveguides of the phase modulators 81a and 81b have the structure of the first embodiment. Instead of this, for example, the structure of the slot waveguide according to another embodiment such as the third embodiment can also be adopted.

Figure 15:
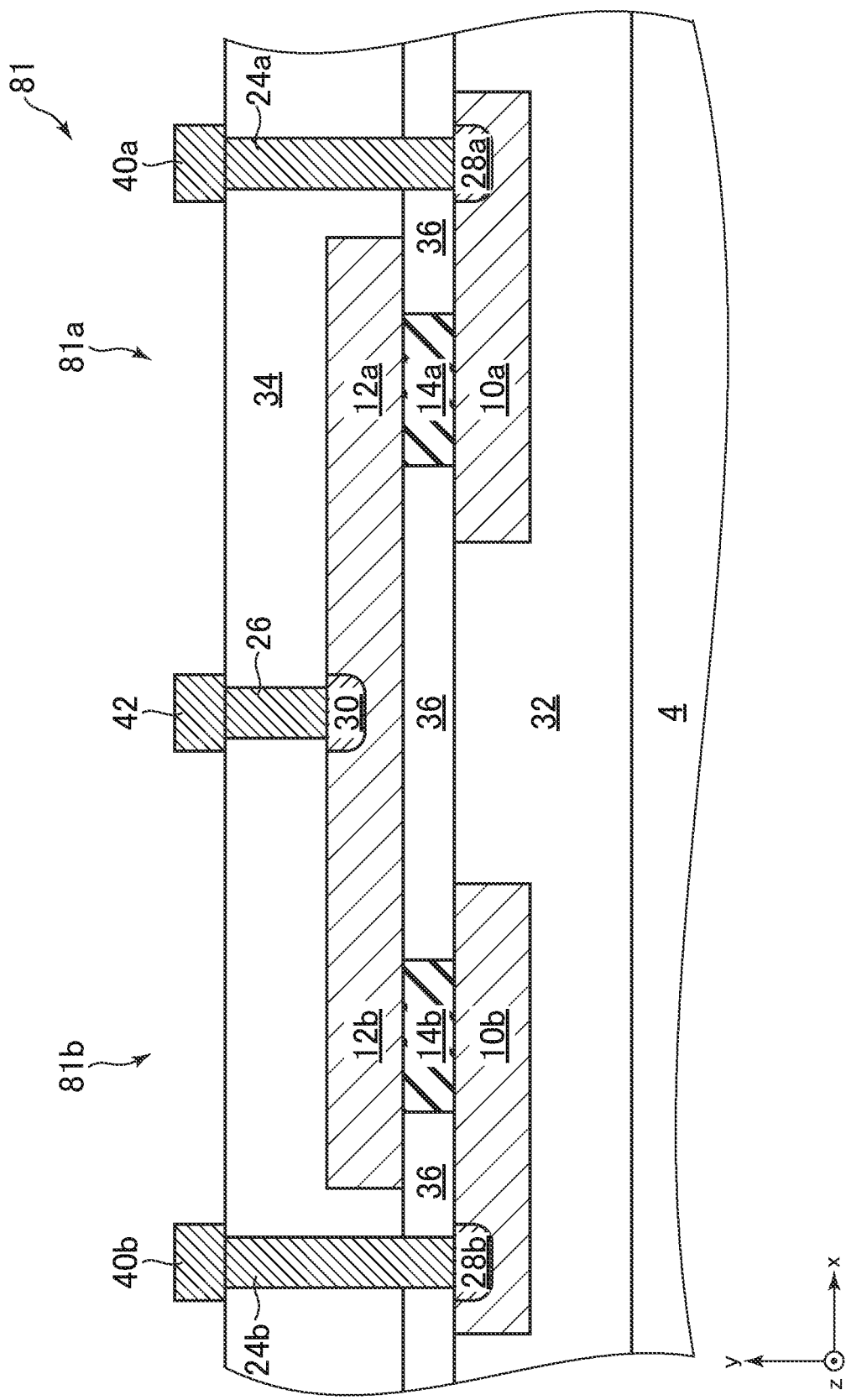
FIG. 15 is a schematic vertical sectional view illustrating a Mach-Zehnder optical modulator according to a sixth embodiment of the present invention.

A sixth embodiment relates to the MZ optical modulator 80 in which the electro-optic waveguide device according to the present invention is applied to the phase modulators 81a and 81b in FIG. 13 as in the fifth embodiment. FIG. 15 is a schematic vertical sectional view illustrating the modulation part 81 according to the sixth embodiment and illustrates the xy cross-section in which the connection structure of electrodes with high-refractive-index layers of the slot waveguide is illustrated as in FIG. 14. The basic structure of the slot waveguides of the phase modulators 81a and 81b illustrated in FIG. 15 corresponds to that of the first embodiment described with reference to FIGS. 1 and 2, as in the example illustrated in FIG. 14 of the fifth embodiment.

In the embodiment, the MZ optical modulator 80 is push-pull driven using one modulator driver for differential signal output. The modulation part 81 illustrated in FIG. 15 has a structure corresponding thereto.

Specifically, one of the differential signals is applied to the electrode 40a and the other of the differential signals is applied to the electrode 40b. The electrodes 40a and 40b configure, for example, a differential traveling-wave electrode such as a slot line. The electrode 42 is applied with a direct-current bias voltage. The electrode 42 may be grounded.

Corresponding to this connection, the lower high-refractive-index layer 10a of the phase modulator 81a and the lower high-refractive-index layer 10b of the phase modulator 81b are set to have the same conductive polarity. On the other hand, the upper high-refractive-index layers 12a and 12b of the respective phase modulators 81a and 81b both have conductive polarity different from the conductive polarity of the lower high-refractive-index layers 10a and 10b. For example, the lower high-refractive-index layers 10a and 10b are set to have P-type polarity and the upper high-refractive-index layers 12a and 12b are set to have N-type polarity.

The upper high-refractive-index layers 12a and 12b of the respective phase modulators 81a and 81b have common conductive polarity and may be mutually continuous since a direct-current bias voltage is commonly applied. In connection portions with the electrodes, as illustrated in FIG. 15, the upper high-refractive-index layers 12a and 12b are connected so that the plug 26 can be common to both the upper high-refractive-index layers. In the xy cross-sectional structure at a position at which the connection structure of the electrodes to the upper high-refractive-index layers is not disposed, each of the upper high-refractive-index layers 12a and 12b may have a shape including the stretches 22 necessary to reduce the edge effect and both the upper high-refractive-index layers is not necessarily continuous.

Figure 16:
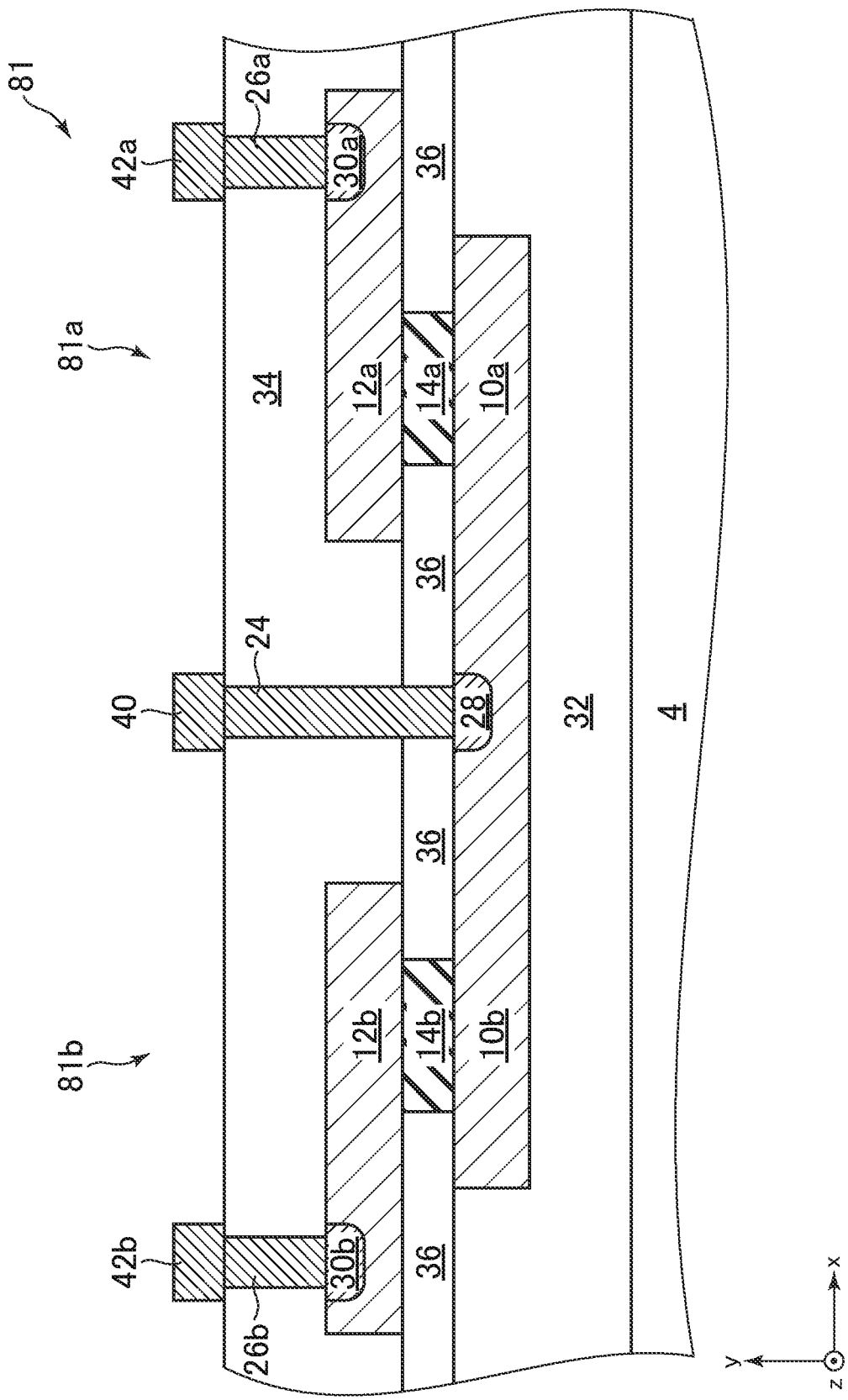
FIG. 16 is a schematic vertical sectional view illustrating a modification example of the Mach-Zehnder optical modulator according to the sixth embodiment of the present invention.

In contrast to the configuration of FIG. 15, differential signals can be applied to the upper high-refractive-index layers 12a and 12b and a direct-current bias voltage can be applied to the lower high-refractive-index layers 10a and 10b. FIG. 16 illustrates this configuration. FIG. 16 is a schematic vertical sectional view illustrating the modulation part 81 and illustrates the xy cross-section in which the connection structure of electrodes with high-refractive-index layers of the slot waveguide is illustrated, as in FIG. 15.

Specifically, electrodes 42a and 42b connected to the upper high-refractive-index layers 12a and 12b are separately provided and differential signals are applied to these electrodes. The lower high-refractive-index layers 10a and 10b are, for example, connected to be formed in the x-direction and a direct-current bias voltage is applied by using the common electrode 40 and plug 24.

In the embodiment, the MZ optical modulator 80 is also configured using the phase modulators 81a and 81b with a common structure to the first embodiment, thereby reducing the driving voltage and reducing the optical loss, as described in the first embodiment. Eventually, the MZ optical modulator 80 can obtain a high-intensity extinction ratio and phase modulation Q value.

FIGS. 15 and 16 illustrate the examples in which the slot waveguides of the phase modulators 81a and 81b have the structure of the first embodiment. Instead of this, for example, the structure of the slot waveguide according to another embodiment such as the third embodiment can also be adopted.

A seventh embodiment is an optical module that includes any electro-optic waveguide device according to each of the foregoing embodiment. The optical module includes the electro-optic waveguide device according to the present invention, a light source optically connected to the electro-optic waveguide device, and a medium that transmits light passing through the electro-optic waveguide device.

Figure 17:
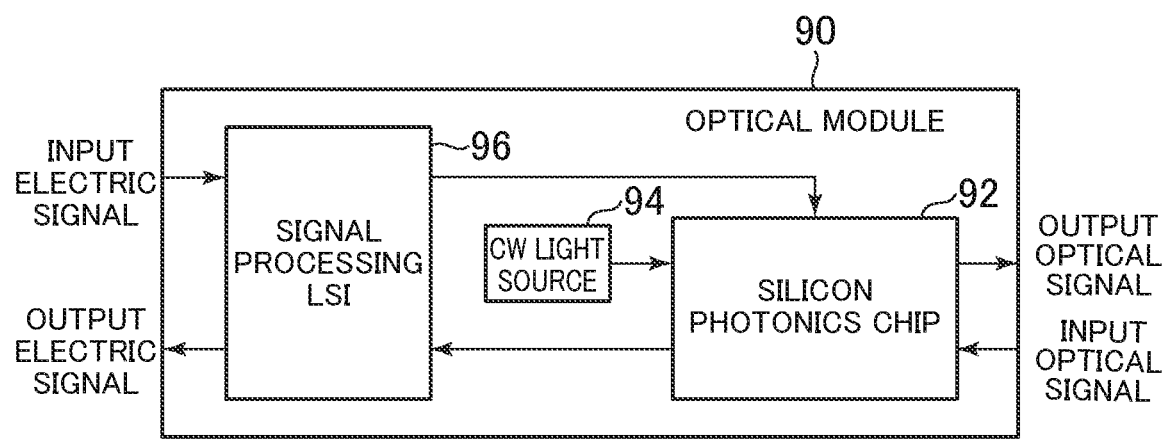
FIG. 17 is a schematic block diagram illustrating an optical module according to a seventh embodiment of the present invention.

FIG. 17 is a schematic block diagram illustrating an optical module 90 according to the embodiment. The optical module 90 is a transceiver that has a transmission function and a reception function and converts an electric signal to an optical signal, and vice versa. The optical module 90 includes a silicon photonics chip 92, a continuous wave (CW) light source 94, and a signal processing LSI 96 in the same casing.

The MZ optical modulator 80 according to the fifth or sixth embodiment is mounted on the silicon photonics chip 92. As described above, in the MZ optical modulator 80, the electro-optic waveguide device according to the present invention is used for the modulation part 81.

The CW light source 94 generates light to be used as a carrier (a carrier wave) and inputs the light to the silicon photonics chip 92. For example, the CW light source 94 is configured as a semiconductor laser such as a DFB laser.

The signal processing LSI 96 is an integrated circuit that includes a circuit processing an electric signal related to the transmission of an optical signal. For example, with regard to the transmission of the optical signal, the signal processing LSI 96 performs a process such as encoding from an electric transmission signal to generate an electric modulated signal of the optical signal and outputs the electric modulated signal to the silicon photonics chip 92. With regard to the reception of the optical signal, an electric demodulated signal extracted from the optical signal is input from the silicon photonics chip 92 to the signal processing LSI 96 and is subjected to a process such as decoding, or error correction, to generate and output an electric transmission signal.

Figure 18:
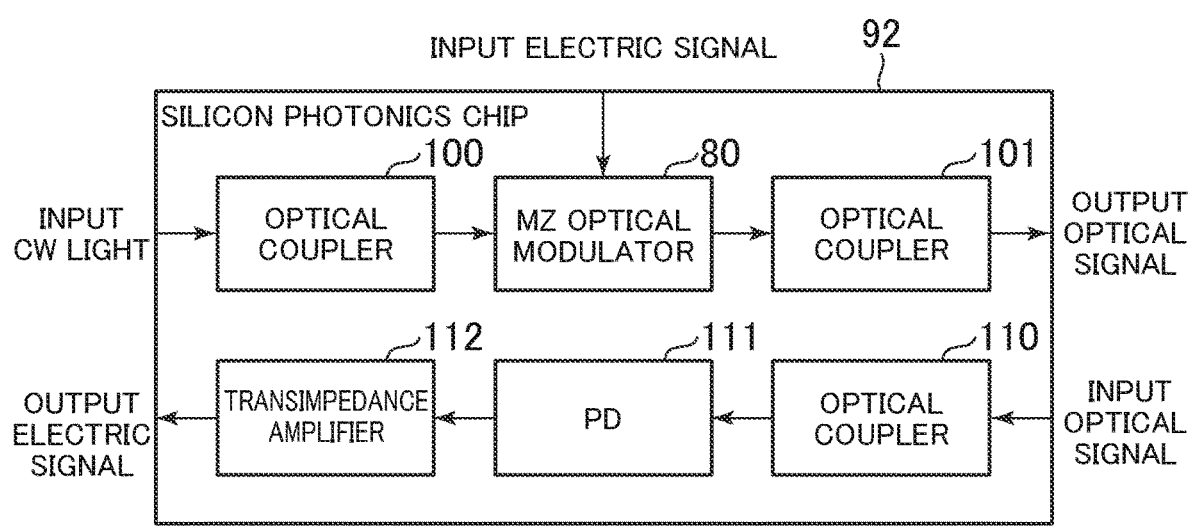
FIG. 18 is a schematic block diagram illustrating a silicon photonics chip used in the optical module according to the seventh embodiment of the present invention.

FIG. 18 is a schematic block diagram illustrating the silicon photonics chip 92. The silicon photonics chip 92 includes optical couplers 100 and 101 and the MZ optical modulator 80 with regard to the transmission function for the optical signal and includes an optical coupler 110, a photodiode 111, and a transimpedance amplifier 112 with regard to the reception function.

The optical coupler 100 causes light input from the CW light source 94 to be incident on a waveguide connected to an input end of the MZ optical modulator 80. An electric signal is input from the signal processing LSI 96 to the MZ optical modulator 80 and a carrier from the CW light source 94 is modulated with the electric signal and is output. The optical coupler 101 couples a waveguide connected to an output end of the MZ optical modulator 80 and an optical transmission path such as an optical fiber. In this configuration, the silicon photonics chip 92 generates a modulated optical signal and outputs the modulated optical signal to the optical transmission path.

On the other hand, the optical coupler 110 couples the optical transmission path to a waveguide connected to the photodiode (PD) 111. The photodiode 111 converts an optical signal received from the optical transmission path into a current. The transimpedance amplifier 112 performs impedance conversion and amplification on a current signal output from the photodiode 111 and outputs the current signal as a voltage signal. In this configuration, the silicon photonics chip 92 generates a demodulated electric signal from the optical signal and outputs the electric signal to the signal processing LSI 96.

In the optical module 90, the electro-optic waveguide device according to the present invention is used to config-ure the MZ optical modulator 80, and thus, the driving voltage can be reduced and the optical loss can be reduced in the optic modulation.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. An electro-optic waveguide device comprising:
a slot waveguide including a lower high-refractive-index layer with a first refractive index and an upper high-refractive-index layer with a second refractive index,
wherein the lower high-refractive-index layer and the upper high-refractive-index layer have conductivity and are disposed to face each other with a gap; and
a slot part formed as a low-refractive-index layer,
wherein the low-refractive-index layer is formed of a material producing an electro-optic effect and has a third refractive index lower than the first refractive index and the second refractive index,
wherein the low-refractive-index layer is formed in the gap to come into contact with the lower high-refractive-index layer and the upper high-refractive-index layer,
wherein one of the lower high-refractive-index layer or the upper high-refractive-index layer includes a stretch stretching beyond both sides of a contact portion with the slot part in a width direction intersecting a transmission direction of the slot waveguide,
at least a portion of the stretch remaining planar with the contact portion, and
the contact portion spanning, in the width direction, for an entire width of the slot part where the slot part makes contact with the one of the lower high-refractive-index layer or the upper high-refractive-index layer, and wherein another one of the lower high-refractive-index layer or the upper high-refractive-index layer includes portions facing the stretch in a cross-sectional shape in the width direction.

2. The electro-optic waveguide device of claim 1, wherein the other one of the lower high-refractive-index layer or the upper high-refractive-index layer includes another stretch, and the stretch and the other stretch include portions facing each other.

3. The electro-optic waveguide device of claim 2, wherein the slot part has a strip shape extending in the transmission direction, and the gap is located at the contact portion, and the stretch and the other stretch layer are equal to each another.

4. The electro-optic waveguide device of claim 3, further comprising:

a clad layer that contacts side surfaces of the low-refractive-index layer, has a refractive index lower than the low-refractive-index layer, and is disposed in the gap.

5. The electro-optic waveguide device of claim 2, wherein the contact portion is formed in a rib shape and extends in the transmission direction.

6. The electro-optic waveguide device of claim 5, wherein the low-refractive-index layer has a width larger than the slot part, and clad layers with a refractive index lower than the low-refractive-index layer are disposed in the gap.

7. The electro-optic waveguide device of claim 1, further comprising:

a lower contact region configured to have an electric resistance lower than the lower high-refractive-index layer and to electrically connect the lower high-refractive-index layer to an electrode; and an upper contact region configured to have an electric resistance lower than the upper high-refractive-index layer and to electrically connect the upper high-refractive-index layer to an electrode.

8. The electro-optic waveguide device of claim 7, wherein the lower contact region and the upper contact region are disposed to come into contact with the lower high-refractive-index layer or the upper high-refractive-index layer at positions spaced with the slot part in the width direction.

9. The electro-optic waveguide device of claim 1, wherein a contact portion of the lower high-refractive-index layer and a contact portion of the upper high-refractive-index layer with the slot part face each other in parallel.

10. The electro-optic waveguide device of claim 1, wherein in regard to an electric field generated between the lower high-refractive-index layer and the upper high-refractive-index layer when a voltage is applied, dimensions of the stretch, in a horizontal direction, are determined so that a reducing rate of an electric field intensity at end portions compared to a middle portion of the slot part in the width direction is set to a predetermined value.

11. An optical module comprising:
electro-optic waveguide device comprising:

a slot waveguide including a lower high-refractive-index layer with a first refractive index and an upper high-refractive-index layer with a second refractive index, wherein the lower high-refractive-index layer and the upper high-refractive-index layer have conductivity and are disposed to face each other with a gap; and a slot part formed as a low-refractive-index layer, wherein the low-refractive-index layer is formed of a material producing an electro-optic effect and has a third refractive index lower than the first refractive index and the second refractive index, wherein the low-refractive-index layer is formed in the gap to come into contact with the lower high-refractive-index layer and the upper high-refractive-index layer, wherein one of the lower high-refractive-index layer or the upper high-refractive-index layer includes a stretch stretching beyond both sides of a contact portion with the slot part in a width direction intersecting a transmission direction of the slot waveguide, at least a portion of the stretch remaining planar with the contact portion, and the contact portion spanning, in the width direction, for an entire width of the slot part where the slot part makes contact with the one of the lower high-refractive-index layer or the upper high-refractive-index layer, and wherein another one of the lower high-refractive-index layer or the upper high-refractive-index layer includes portions facing the stretch in a cross-sectional shape in the width direction;

a light source optically connected to the electro-optic waveguide device; and a medium for transmitting light passing through the electro-optic waveguide device.

12. The optical module of claim 11, wherein
the other one of the lower high-refractive-index layer and the upper high-refractive-index layer includes another stretch, and the stretch and the other stretch include portions facing each other.

13. The optical module of claim 12, wherein
the slot part has a strip shape extending in the transmission direction, and the gap is located at the contact portion, and the stretch and the other stretch are equal to each another.

14. The optical module of claim 13, further comprising:
a clad layer that contacts side surfaces of the low-refractive-index layer, has a refractive index lower than the low-refractive-index layer, and is disposed in the gap.

15. The optical module of claim 12, wherein the contact portion is formed in a rib shape and extends in the transmission direction.

16. The optical module of claim 15, wherein
the low-refractive-index layer has a width larger than the slot part, and clad layers with a refractive index lower than the low-refractive-index layer are disposed in the gap.

17. The optical module of claim 11, further comprising:
a lower contact region configured to have an electric resistance lower than the lower high-refractive-index layer and to electrically connect the lower high-refractive-index layer to an electrode; and an upper contact region configured to have an electric resistance lower than the upper high-refractive-index layer and to electrically connect the upper high-refractive-index layer to an electrode.

18. The optical module of claim 17, wherein the lower contact region and the upper contact region are disposed to come into contact with the lower high-refractive-index layer or the upper high-refractive-index layer at positions spaced with the slot part in the width direction.

19. The optical module of claim 11, wherein a contact portion of the lower high-refractive-index layer and a contact portion of the upper high-refractive-index layer with the slot part face each other in parallel.

20. The optical module of claim 11, wherein
in regard to an electric field generated between the lower high-refractive-index layer and the upper high-refractive-index layer when a voltage is applied, dimensions of the stretch, in a horizontal direction, are determined so that a reducing rate of an electric field intensity at end portions compared to a middle portion of the slot part in the width direction is set to a predetermined value.

* * * * *

UNITED STATES PATENT AND TRADEMARK OFFICE
CERTIFICATE OF CORRECTION

PATENT NO. : 10,921,517 B2
APPLICATION NO. : 16/551175
DATED : February 16, 2021
INVENTOR(S) : Kensuke Ogawa et al.

It is certified that error appears in the above-identified patent and that said Letters Patent is hereby corrected as shown below:

In the Claims

In Claim 3, Column 23, Line 18, "the stretch and the other stretch layer are equal to" should be changed to -- the stretch and the other stretch are equal to, --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*